United States Patent
Murao

(10) Patent No.: US 11,633,912 B2
(45) Date of Patent: Apr. 25, 2023

(54) ADDITIVE MANUFACTURING APPARATUSES WITH MOVABLE ROLL SUPPORTS AND CONTROLLER FOR CUTTING EDGE OF SHEET MEMBER

(71) Applicant: CANON KABUSHIKI KAISHA, Tokyo (JP)

(72) Inventor: Hitoshi Murao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 16/935,483

(22) Filed: Jul. 22, 2020

(65) Prior Publication Data

US 2021/0053279 A1    Feb. 25, 2021

(30) Foreign Application Priority Data

Aug. 23, 2019 (JP) .............................. JP2019-153044
Jun. 25, 2020 (JP) .............................. JP2020-109231

(51) Int. Cl.
  *B29C 64/153* (2017.01)
  *B29C 64/268* (2017.01)
  (Continued)

(52) U.S. Cl.
  CPC ............ *B29C 64/153* (2017.08); *B22F 12/60* (2021.01); *B29C 64/188* (2017.08);
  (Continued)

(58) Field of Classification Search
  CPC ... B29C 64/153; B29C 64/188; B29C 64/205; B29C 64/241; B29C 64/268;
  (Continued)

(56) References Cited

U.S. PATENT DOCUMENTS

2007/0075461 A1* 4/2007 Hunter .................. B29C 64/245
                                                                        425/174
2016/0158818 A1* 6/2016 Atwood .................. B08B 1/008
                                                                        134/6

(Continued)

FOREIGN PATENT DOCUMENTS

JP       2000-336403 A     12/2000
JP       2004-143581 A      5/2004
             (Continued)

*Primary Examiner* — Joseph S Del Sole
*Assistant Examiner* — Guy F Mongelli
(74) *Attorney, Agent, or Firm* — Venable LLP

(57) ABSTRACT

A method of manufacturing a three-dimensionally shaped object includes a first powder-layer forming process in which a first portion of at least one thickness determining member forms a powder layer by moving in contact with powder, a solidifying process in which a solidified portion is formed in the powder layer formed in the first powder-layer forming process, a second powder-layer forming process, performed after the solidifying process, in which a second portion of the at least one thickness determining member forms a powder layer by moving in contact with the powder, and a renewal process performed between the first powder-layer forming process and the second powder-layer forming process. In the renewal process, the portion having been in contact with the powder is renewed such that the second portion is different from the first portion.

13 Claims, 18 Drawing Sheets

(51) Int. Cl.
  *B29C 64/188*  (2017.01)
  *B29C 64/241*  (2017.01)
  *B29C 64/393*  (2017.01)
  *B29C 64/205*  (2017.01)
  *B22F 12/60*  (2021.01)
  *B33Y 50/02*  (2015.01)
  *B33Y 10/00*  (2015.01)
  *B33Y 30/00*  (2015.01)
  *B33Y 40/20*  (2020.01)

(52) U.S. Cl.
  CPC .......... *B29C 64/205* (2017.08); *B29C 64/241* (2017.08); *B29C 64/268* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
  CPC .... B29C 64/393; B22F 12/60; B22F 2999/00; B22F 10/37; B22F 12/63; B22F 12/67; B22F 12/90; B33Y 10/00; B33Y 30/00; B33Y 40/20; B33Y 50/02; B33Y 40/00; Y02P 10/25
  See application file for complete search history.

(56) References Cited

U.S. PATENT DOCUMENTS

2016/0279706 A1* 9/2016 Domrose .............. B22F 10/366
2016/0361869 A1* 12/2016 Mark .................... B33Y 50/02

FOREIGN PATENT DOCUMENTS

| JP | 2007-100199 A | 4/2007 |
| JP | 2016-203510 A | 12/2016 |

\* cited by examiner

ADDITIVE MANUFACTURING APPARATUSES WITH MOVABLE ROLL SUPPORTS AND CONTROLLER FOR CUTTING EDGE OF SHEET MEMBER

BACKGROUND OF THE INVENTION

Field of the Invention

The present invention relates to a method of manufacturing a product (a three-dimensionally shaped object), such as a so-called powder depositing-and-melting method, that repeats formation and solidification of a powder layer, and to an additive manufacturing apparatus used for the method.

Description of the Related Art

In recent years, so-called 3D printers are increasingly developed, and various methods are tried for the development. For example, there are known methods such as fused deposition modeling, stereolithography that uses photo-curable resin, and powder depositing-and-melting method.

The powder depositing-and-melting method forms a three-dimensionally shaped object by repeating a process to spread material powder, containing nylon resin, ceramic, or metal, so as to form a layer of the powder, and a process to selectively heat a portion of the powder layer by irradiating the portion with a laser beam and then solidify the portion. In recent years, a powder depositing-and-melting method that uses the metal powder as the material powder is started to be used for manufacturing products required to have high mechanical strength and good thermal conductivity.

In the powder depositing-and-melting method, however, when a desired portion of the powder layer is irradiated with a laser beam in accordance with a shape to be formed, for melting or sintering the portion, a projecting solidified portion (projecting portion) that locally projects from a solidified portion may be formed due to a state of the deposited powder layer or irradiation conditions of the laser beam. In addition, the powder heated to a high temperature may fly like sparks and adhere to the surface of a solidified portion, forming a projecting solidified portion (projecting portion).

If the height of the projecting portion is larger than the thickness of a powder layer that is to be formed after the formation of the projecting portion, the projecting portion will interfere with a powder-layer forming mechanism when the powder-layer forming mechanism deposits and flattens powder for the next layer. In this case, the powder-layer forming mechanism may be caught on the projecting portion and prevented from moving, or otherwise a product in which the projecting portion is formed and which is being manufactured may be pushed down by the powder-layer forming mechanism, and become an obstacle to the manufacturing apparatus. As a result, the manufacturing apparatus may be stopped or prevented from uniformly spreading the powder layer.

As countermeasures to this problem, Japanese Patent Application Publication No. 2007-100199 discloses a method in which when the powder-layer forming mechanism (material supplying unit) contacts a projecting portion and receives force larger than a predetermined force, the material supplying unit temporarily retracts while moving.

In the method of Japanese Patent Application Publication No. 2007-100199, since the material supplying unit temporarily retracts while moving when the material supplying unit contacts a projecting portion, the manufacturing apparatus can be prevented from being stopped. However, in a period of time in which the material supplying unit retracts, the material powder cannot be supplied properly. For example, in a case where the material supplying unit is forming a powder layer while pushing a pile of powder by using a blade, if the blade is retracted at a position where a projecting portion is formed, the blade will move, with the pile of powder being left at the position. Even if the blade returns from a retracting position after passing the projecting portion, the material powder is short at a position to which the blade returns from the retracting position. As a result, the powder layer will not be formed after that, or otherwise the thickness of the powder layer will become thinner than a predetermined thickness. Consequently, the accuracy in shape of the three-dimensionally shaped object will deteriorate.

For this reason, another technique is proposed in which the blade can deform when receiving a force larger than a predetermined force. The blade is made thinner or made of elastic material, although rigid in the conventional arts. In this technique, since the blade can deform and climb over a projecting portion even if the blade contacts the projecting portion, the change in thickness of a powder layer can be suppressed.

However, if the blade is made thinner or made of elastic material, the wear resistance and the tear strength of the blade are lowered. Thus, if the blade rubs against the powder and projections in the formation of powder layers, the blade may be worn or damaged. The wear or the damage of the blade prevents the formation of a flat powder layer with a uniform thickness, possibly deteriorating the accuracy in shape of the three-dimensionally shaped object or causing a larger projecting portion to be formed. As a result, the manufacturing yield of three-dimensionally shaped objects will be lowered, or the manufacturing operation will have to be stopped during the operation.

Thus, it has been desired to achieve a method in which when a three-dimensionally shaped object (product) is manufactured by repeating formation and solidification of a powder layer, the deterioration of accuracy in the manufacturing or the stop of the manufacturing operation due to the wear or the damage of the material supplying unit can be prevented, and the additive manufacturing of the product can be reliably continued.

SUMMARY OF THE INVENTION

According to a first aspect of the present invention, a method of manufacturing a three-dimensionally shaped object includes a first powder-layer forming process in which a first portion of at least one thickness determining member forms a powder layer by moving in contact with powder, a solidifying process in which a solidified portion is formed in the powder layer formed in the first powder-layer forming process, by irradiating the powder layer with an energy beam, a second powder-layer forming process, performed after the solidifying process, in which a second portion of the at least one thickness determining member forms a powder layer by moving in contact with the powder, and a renewal process performed between the first powder-layer forming process and the second powder-layer forming process. In the renewal process, the portion having been in contact with the powder is renewed such that the second portion is different from the first portion.

According to a second aspect of the present invention, an additive manufacturing apparatus includes at least one thickness determining member, a holding portion configured to hold the at least one thickness determining member, an energy beam irradiating portion, and a control unit configured to control the holding portion and the energy beam irradiating portion. The holding portion includes a mechanism configured to renew one portion of the at least one thickness determining member having been in contact with powder, in a period of time between repetitive powder-layer forming processes in each of which a powder layer is formed by moving the one portion in contact with the powder.

According to a third aspect of the present invention, a powder depositing apparatus includes at least one sheet-like member, and a holding portion configured to hold the at least one sheet-like member. The powder depositing apparatus is configured to repeatedly supply powder used for manufacturing a three-dimensionally shaped object. The holding portion includes a mechanism configured to renew a portion of the at least one sheet-like member having been in contact with the powder, in a period of time between repetitive processes in each of which the powder is supplied.

Further features of the present invention will become apparent from the following description of exemplary embodiments with reference to the attached drawings.

DESCRIPTION OF THE EMBODIMENTS

Figure 1:
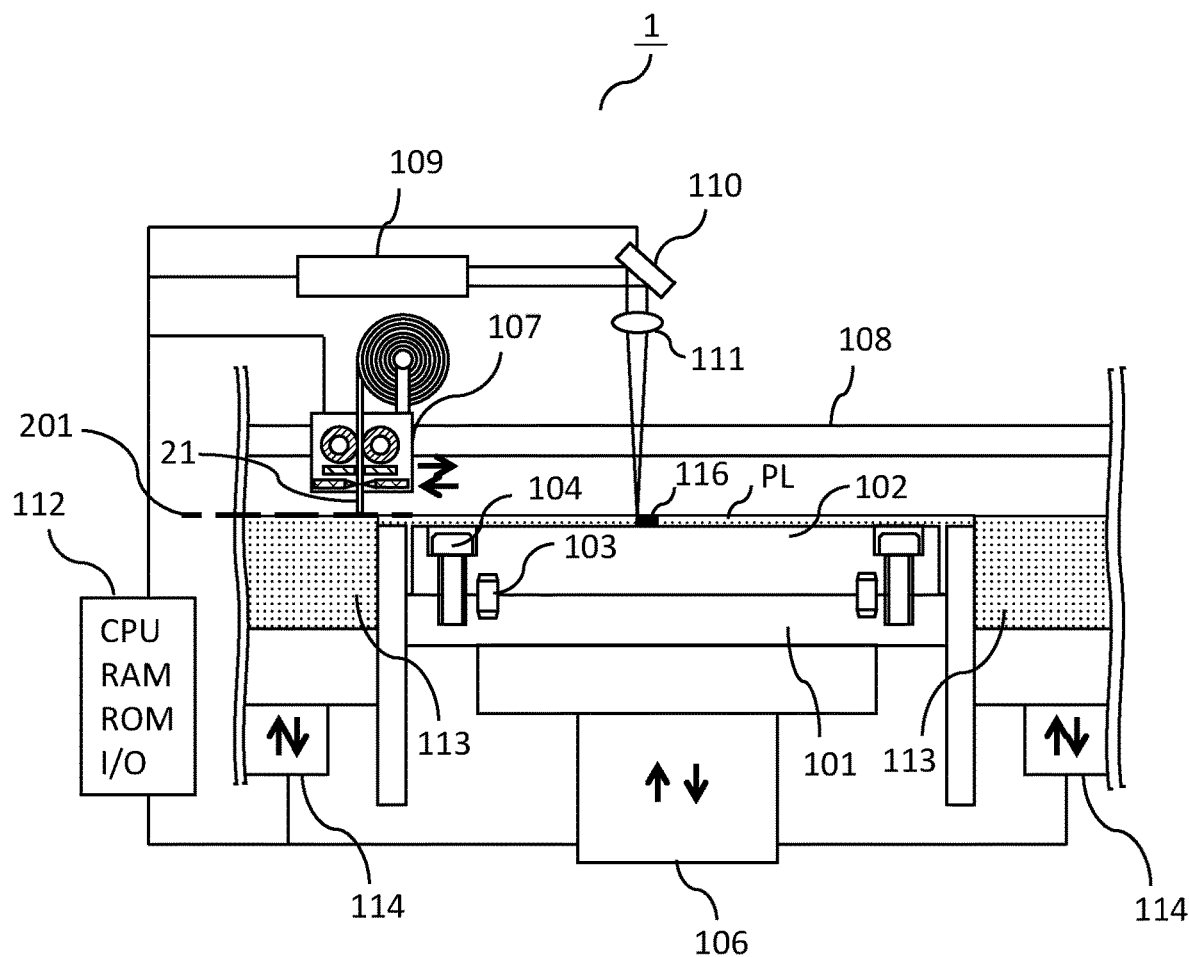
FIG. 1 is a schematic diagram illustrating a configuration of an additive manufacturing apparatus of a first embodiment.

Hereinafter, a method of manufacturing a three-dimensionally shaped object and an additive manufacturing apparatus of an embodiment of the present invention will be described with reference to the accompanying drawings. Note that in the drawings referred to in the below-described embodiments and the examples, a member having an identical function is denoted by an identical reference numeral, unless otherwise specified.

In the embodiments of the present invention, when a powder layer is heated for forming a solidified portion, the heated powder may sinter at a temperature lower than a melting point, or the powder may be heated to a temperature equal to or higher than the melting point, melted, and cooled and solidified. In addition, in the embodiments of the present invention in which one solidified portion is put on another for forming a three-dimensionally shaped object, there is a case in which an interface between two solidified portions can be identified in the observation of a cross section of the three-dimensionally shaped object. However, if the two solidified portions have melted uniformly, the interface may not be clearly identified.

First Embodiment

Additive Manufacturing Apparatus

With reference to FIG. 1, an additive manufacturing apparatus 1 of the present embodiment will be described. FIG. 1 is a schematic diagram for illustrating a configuration of the additive manufacturing apparatus 1.

The additive manufacturing apparatus 1 includes a manufacturing table 101, to which a plate 102 can be attached. The plate 102 serves as a base used when a three-dimensionally shaped object (product) is formed. The manufacturing table 101 includes a pin 103 that serves as a positional reference. The plate 102 is positioned by the pin 103 fitting in a pin hole of the plate 102. In the present embodiment, the plate 102 is fixed to the manufacturing table 101 via a screw 104. Note that the plate 102 may not be a plate-like member as long as it serves as a supporting base when a three-dimensionally shaped object is formed. In addition, the method of positioning the plate 102 with respect to the manufacturing table 101 is also not limited to the above-described embodiment. The manufacturing table 101 is supported by a vertical movement mechanism 106 so as to be able to move in a vertical direction (positive and negative directions in a Z-axis).

A powder storage portion 113 that stores the material powder is disposed on the right side and left side with respect to the manufacturing table 101. The powder storage portion 113 supplies the material powder, which is used when a powder depositing apparatus 107 forms a powder layer on the plate 102. The powder storage portion 113 is supported by a powder-storage-portion vertical movement mechanism 114 so as to be able to move in the vertical direction (positive and negative directions in the Z-axis). A predetermined amount of material powder is lifted by moving the powder storage portion 113 by a predetermined distance toward the positive direction in the Z-axis, and the material powder is pushed by a sheet-like member 21 by moving the powder depositing apparatus 107 horizontally along an X-axis, so that a powder layer can be formed on the plate 102. Note that the positive direction means a direction indicated by an arrow of a coordinate axis in the drawings, and the negative direction means a direction opposite to the direction indicated by an arrow of a coordinate axis in the drawings. A deposition-height limiting line 201 indicated by a dotted line in FIG. 1 represents the height of the top surface of a powder layer to be formed by the powder depositing apparatus 107. Note that the powder storage portion 113 may not necessarily be disposed on both sides with respect to the manufacturing table 101 as illustrated in FIG. 1. That is, the powder storage portion 113 may be disposed on either the right side or the left side with respect to the manufacturing table 101 if the powder storage portion 113 has a capacity capable of storing a predetermined amount of powder, which is necessary for the manufacturing.

Above the manufacturing table 101, the powder depositing apparatus 107 and a movement guide 108 are disposed. The powder depositing apparatus 107 is an apparatus to deposit the material powder by a predetermined thickness, and is supported by the movement guide 108 so as to move back and forth horizontally along the X-axis, for moving in a space above the plate 102 (that is, for scanning the plate 102).

Figure 2:
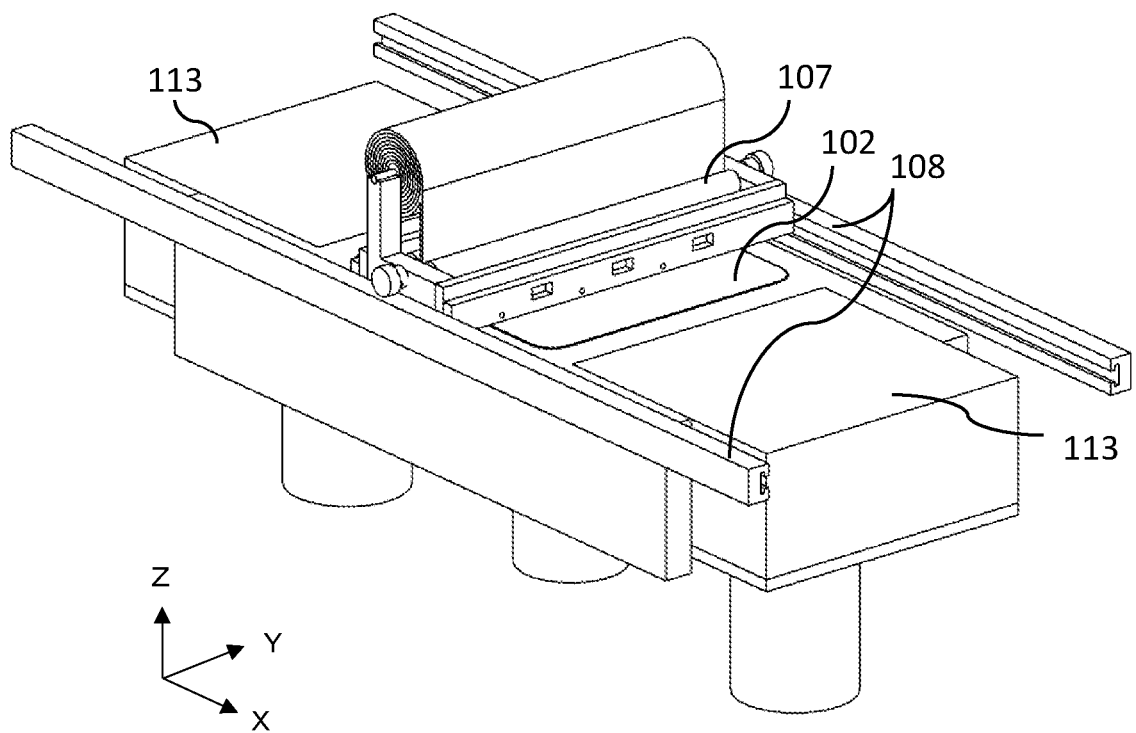
FIG. 2 is a perspective view schematically illustrating a powder depositing apparatus and its surroundings.
Figure 3:
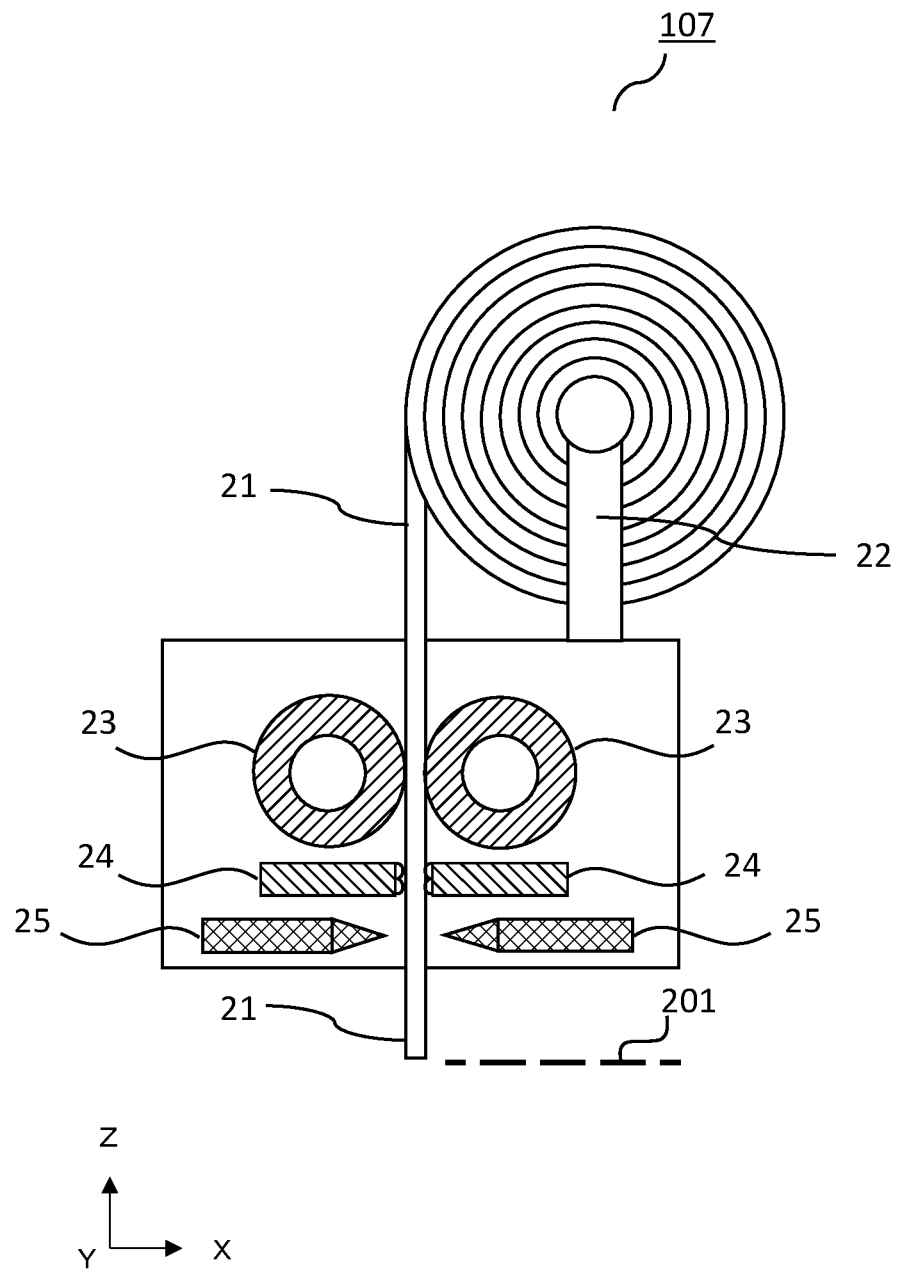
FIG. 3 is a partial cross-sectional view schematically illustrating a structure of the powder depositing apparatus of the first embodiment.

FIG. 2 is a perspective view schematically illustrating the powder depositing apparatus 107 and its surroundings of the present embodiment. FIG. 3 is a partial cross-sectional view schematically illustrating a structure of the powder depositing apparatus 107 of the present embodiment.

As illustrated in FIG. 3, the powder depositing apparatus 107 includes the sheet-like member 21 wound like a roll. The sheet-like member 21 is rotatably supported by a roll support, which serves as a holding portion 22. The sheet-like member 21 serves as a blade that pushes a pile of material powder toward a direction along the X-axis and forms a powder layer whose top surface is flat and whose thickness is constant. Since the thickness of a powder layer is determined by the height of a lower edge portion of the sheet-like member 21, the sheet-like member 21 is a thickness determining member that determines the thickness of the powder layer. The height of the lower edge portion of the sheet-like member 21 is adjusted so as to be equal to the height of the deposition-height limiting line 201. As illustrated in FIG. 3, when forming a powder layer, the sheet-like member 21 is nipped by the fixing portions 24 in a thickness direction, so that the position of the sheet-like member 21 is fixed and the height of the lower edge portion is regulated.

The sheet-like member 21 has rigidity necessary for regulating the thickness of each powder layer. In addition, the sheet-like member 21 is made of a material that allows a contact portion of the sheet-like member 21 to deform in accordance with the shape of an undesirably-formed projecting portion of a solidified layer when contacting the projecting portion. That is, the sheet-like member 21 is made of elastic material, for example. Specifically, the sheet-like member 21 is made of an elastic material containing a main component such as silicone rubber or elastomer. Thus, the sheet-like member 21, which is an elastic member, has a contact portion and a non-contact portion formed adjacent to the contact portion. The contact portion is a portion that contacts the projecting portion, and has flexibility that allows the contact portion to deform in accordance with the shape of the projecting portion. The non-contact portion is a portion that does not contact the projecting portion, and has rigidity that causes the non-contact portion to hardly deform. Thus, even if a projecting portion is formed, the flatness of a powder layer formed around the projecting portion by spreading the powder is kept by using the sheet-like member 21.

However, since the sheet-like member 21 is made of the material having flexibility that allows the sheet-like member 21 to deform in accordance with the shape of a projecting portion, the wear resistance of the sheet-like member 21 and the tear resistance obtained when the sheet-like member 21 is damaged are not so high. Thus, if the sheet-like member 21 repeatedly rubs against the powder and projecting portions, the leading edge portion of the sheet-like member 21 will be worn or damaged before the completion of the manufacturing. Consequently, the quality of the manufactured object may deteriorate, or the manufacturing may become difficult to continue.

For this reason, the powder depositing apparatus 107 of the present embodiment includes a mechanism that automatically renews the leading edge portion of the sheet-like member 21 before the leading edge portion of the sheet-like member 21 is worn to the extent that the quality of the manufactured object deteriorates or the manufacturing becomes difficult to continue. The renewal of the leading edge portion of the sheet-like member 21 means that a portion of the sheet-like member 21 having been in contact with the powder in the powder-layer forming process is replaced with a new (unworn) portion of the sheet-like member 21 having not been in contact with the powder. In the description of the present embodiment or other embodiments, the portion having not been in contact with the powder literally means a portion having not in contact with the powder at all, but is not strictly limited to this. For example, it can be construed that a portion that is almost not worn even if slightly in contact with the powder is substantially included in the portion having not been in contact with the powder.

The mechanism to renew (change) the leading edge portion includes cutting portions 25 and rollers (rotation portions) 23. The cutting portions 25 cut the leading edge portion of the sheet-like member 21, and the rollers 23 move the sheet-like member 21.

As illustrated in FIG. 3, the cutting portions 25, which cut the sheet-like member 21, may be a pair of cutters that moves to nip the sheet-like member 21. Note that the cutting portions 25 may not be a pair of cutters as long as the sheet-like member 21 is cut horizontally along a line for ensuring the flatness of powder layers. For example, the cutting portions 25 may be a cutter and a plate-like member that nip and cut the sheet-like member 21, or may be a cutting mechanism such as a wire cutter.

The rollers 23 serve as a moving portion, and have a function to draw out the sheet-like member 21. Specifically, the rollers 23 rotate while nipping the sheet-like member 21 in the thickness direction, for drawing the sheet-like member 21 in a downward direction extending from the roll in FIG. 3. As described later with reference to FIG. 4C, the height of the lower edge portion of the sheet-like member 21 is adjusted by controlling the amount of rotation of the rollers 23. Thus, it is preferable that the amount of rotation of the rollers 23 is controlled by using a stepping motor, or is feedback-controlled by using an encoder that detects a rotational position of the rollers 23.

Next, with reference to FIGS. 4A to 4D, an operation to renew the leading edge portion of the sheet-like member 21, that is, a renewal process will be described. Note that one portion of the powder depositing apparatus 107 is not illustrated in FIGS. 4A and 4B for convenience of illustration.

Figure 4A:
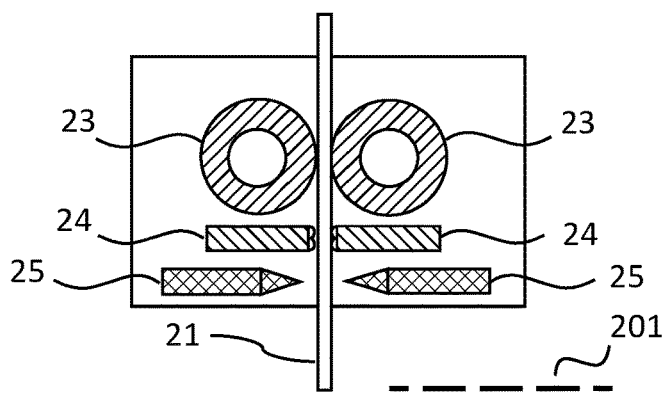
FIG. 4A is a diagram illustrating a state where a sheet-like member is nipped and fixed by fixing portions and the height of a lower edge portion of the sheet-like member is regulated.

FIG. 4A illustrates a state where the sheet-like member 21 is nipped and fixed by the fixing portions 24 in the thickness direction in the powder-layer forming process and the height of the lower edge portion of the sheet-like member 21 is regulated. In this operation, the sheet-like member 21 is also nipped by the rollers 23, but the rollers 23 are not applied with torque. The rollers 23 may be stopped by a brake. The cutters of the cutting portions 25 are retracted to both sides so as not to damage the sheet-like member 21.

Figure 4B:
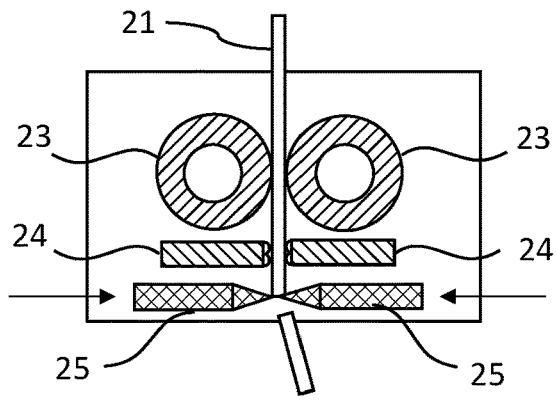
FIG. 4B is a diagram illustrating a state where a leading edge portion of the sheet-like member is cut off by moving cutters of cutting portions so as to nip the sheet-like member.

Then, the mechanism cuts off the leading edge portion by using the cutting portions 25 for renewing the leading edge portion of the sheet-like member 21. That is, as illustrated in FIG. 4B, the mechanism moves the cutters of the cutting portions 25 so as to nip the sheet-like member 21 and causes the cutters to cut the sheet-like member 21 for cutting off the leading edge portion. In this operation, the mechanism causes the cutters to cut the sheet-like member 21 while causing the fixing portions 24 to fix the sheet-like member 21 for increasing the accuracy in shape of a cut portion of the sheet-like member 21.

Figure 4C:
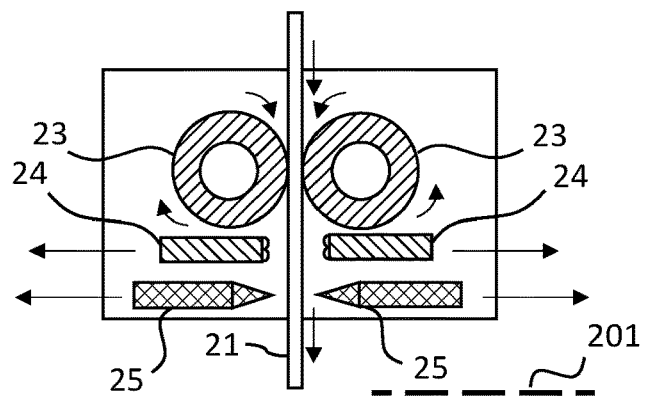
FIG. 4C is a diagram illustrating a state where a leading edge portion of the sheet-like member is lowered to a position that has the height of a deposition-height limiting line.

Then, as illustrated in FIG. 4C, the mechanism causes the cutters of the cutting portions 25 to retract to positions where the cutters do not contact the sheet-like member 21, and causes the fixing portions 24 to move away from the sheet-like member 21 for releasing the sheet-like member 21 so that the sheet-like member 21 can move in the vertical direction. Then the mechanism lowers a new leading edge portion (formed by the cutting) of the sheet-like member 21 to the deposition-height limiting line 20, while rotating the rollers 23 and moving the sheet-like member 21 from the roll (not illustrated). With this operation, the new leading edge portion moves to a position in which the new leading edge portion can contact the powder in the next powder-layer forming process (moving process). Since the top surface of the powder layer (i.e. thickness of the powder layer) is regulated by the height of the new leading edge portion, the amount of rotation of the rollers 23 is accurately controlled. Thus, the height of the leading edge portion of the sheet-like member 21 may be detected by a photosensor, and a detection result by the photosensor may be fed back to a driving mechanism for the rollers 23.

Figure 4D:
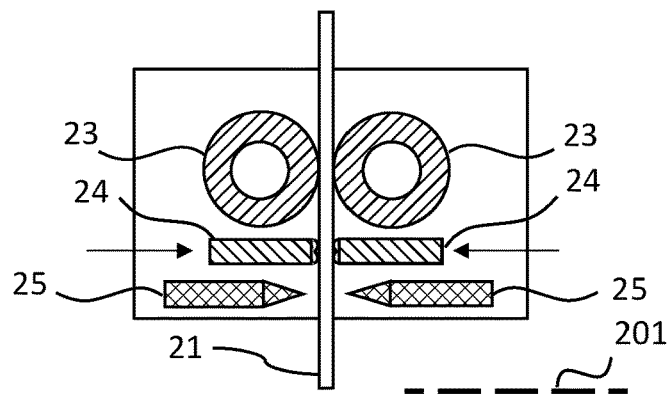
FIG. 4D is a diagram illustrating a state where the sheet-like member is nipped and fixed by the fixing portions.

After adjusting the height of the leading edge portion of the sheet-like member 21 so that the height is equal to the height of the deposition-height limiting line 201, the mechanism causes the fixing portions 24 to nip and fix the sheet-like member 21, as illustrated in FIG. 4D. In the above-described series of operations, the leading edge portion of the sheet-like member 21 is renewed.

The renewal operation is performed after the powder depositing apparatus 107 is moved to a predetermined position in the additive manufacturing apparatus 1.

Figure 5:
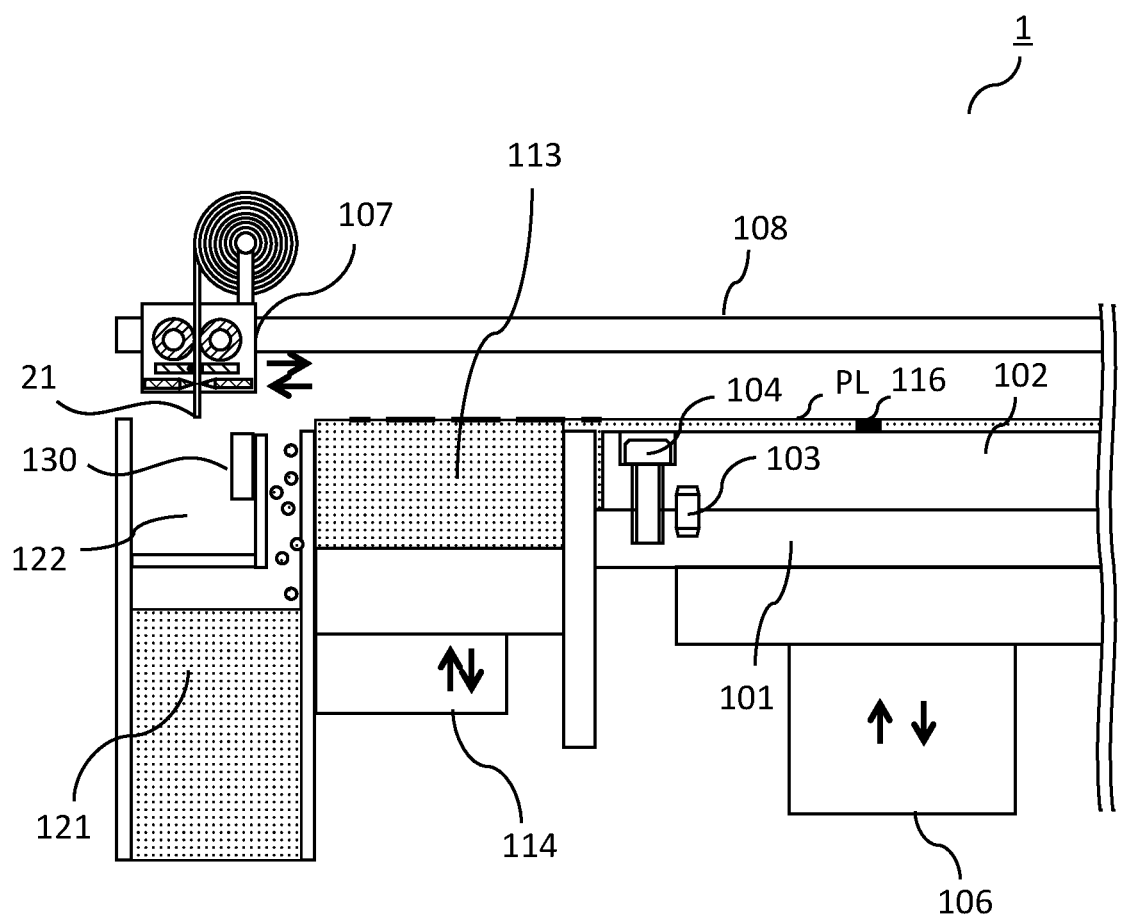
FIG. 5 is a schematic diagram for illustrating a position in which a leading edge portion of the sheet-like member is renewed.

FIG. 5 is a schematic diagram for illustrating the position in which the leading edge portion of the sheet-like member 21 is renewed. FIG. 5 illustrates a left portion of the additive manufacturing apparatus 1, which is not illustrated in FIG. 1. An excess-powder collecting space 121 and a cutting-operation space 122 are disposed opposite to the manufacturing table 101 with respect to the powder storage portion 113. The excess-powder collecting space 121 is a space for collecting excess powder. The excess powder is the powder left after the powder-layer forming process that forms a powder layer with a predetermined thickness, and conveyed to the excess-powder collecting space 121 by the powder depositing apparatus 107. The collected powder may be disposed of, or may be reused through some treatment. However, if the collected powder contains no dust and has the same quality as that of the powder of the powder storage portion, it may be directly reused as the material powder.

The cutting-operation space 122 is a space in which the renewal operation (described with reference to FIGS. 4A to 4D) for the leading edge portion of the sheet-like member 21 is performed. After a powder layer is formed, the powder depositing apparatus 107 is moved to the cutting-operation space 122 and the renewal operation is performed for the leading edge portion, while the powder layer is irradiated with a laser beam. The leading edge portion that was used and cut is collected in a container of the cutting-operation space 122.

In the present embodiment, a sensor 130 is disposed in the cutting-operation space 122. The sensor 130 serves as a checking portion, which measures the shape of the leading edge portion of the sheet-like member 21. The sensor 130 measures the shape of the whole of the leading edge portion of the sheet-like member 21 in the Y direction. The sensor may be an image sensor, or may be a combination of an image sensor and a Y-direction scanning mechanism. In the former case, the image sensor picks up an image of the whole of the leading edge portion in the Y direction; in the latter case, the image sensor picks up an image of one portion of the leading edge portion in the Y direction. The sensor 130 may not be an image sensor, but be a distance sensor or an ultrasonic sensor.

In the present embodiment, after a powder layer is formed and while the powder layer is irradiated with a laser beam, the shape of the leading edge portion of the sheet-like member 21 is measured by using the sensor 130, then whether to renew the leading edge portion is determined, and then the renewal operation described with reference to FIGS. 4A to 4D is performed if necessary. For example, a control unit 112 processes an image captured by the sensor 130, determines whether the degree of deformation of the leading edge portion caused by wear or damage exceeds a predetermined degree, and executes the renewal process depending on a determination result. Note that whether to renew the leading edge portion may be determined, depending not on the shape of the leading edge portion of the sheet-like member 21, but on a condition of the surface of a powder layer.

In addition, after the leading edge portion is renewed, the shape of a new leading edge portion of the sheet-like member 21 may be measured by using the sensor 130 for checking that the renewal operation has been performed without fail. For example, there may be a case in which the shape of a cut portion of the sheet-like member 21 is unacceptable because there was dust between the cutter and the sheet-like member 21. The sensor 130 can detect such a case. In such a case, the control unit 112 executes the renewal process again for the leading edge portion, before starting the next powder-layer forming operation.

Referring back to FIG. 1, a laser light source 109, a scanner 110, and a condensing lens 111, which constitute an irradiation portion that emits an energy beam, are disposed above the manufacturing table 101.

The laser light source 109, the scanner 110, and the condensing lens 111 are an irradiation optical system that irradiates a desired focal point, located on a powder layer PL spread on the plate 102 by the powder depositing apparatus 107, with a heating laser beam in accordance with the shape of an object to be manufactured.

The control unit 112 of the additive manufacturing apparatus 1 is a computer that controls operation of each unit of the additive manufacturing apparatus 1, and includes a CPU, a ROM, a RAM, and an I/O port.

The ROM is a computer-readable storage medium, and stores a program used for operating the additive manufacturing apparatus 1. For example, the control unit 112 executes the program for performing the powder-layer forming process, in which the powder depositing apparatus 107 serving as a powder-layer forming unit moves and forms a powder layer having a predetermined thickness above the base. The control unit 112 may execute the program for performing the solidifying process, in which the powder layer PL is irradiated with the energy beam in accordance with the shape of a three-dimensionally shaped object and a corresponding solidified portion 116 is formed.

The control unit 112 may execute the program, while the solidifying process is performed, for measuring the shape of the leading edge portion of the sheet-like member 21 by using the sensor 130, and for determining whether to renew the leading edge portion. The control unit 112 may execute the program for performing the renewal process for the leading edge portion, described with reference to FIGS. 4A to 4D. The control unit 112 may execute the program, after the renewal process for the leading edge portion, for measuring the shape of a new leading edge portion of the sheet-like member 21 by using the sensor 130.

The I/O port is connected to an external device or a network (both not illustrated). For example, the data necessary for the additive manufacturing is sent from an external computer to the additive manufacturing apparatus 1 and vice versa, via the I/O port. The data necessary for the additive manufacturing includes data on the shape of a three-dimensionally shaped object to be formed, information on the material to be used for the additive manufacturing, and layer shape data for each sintered layer. The layer shape data is slice data. The slice data may be sent from an external computer, or may be created by the CPU of the control unit 112 in accordance with the data on the shape of the three-dimensionally shaped object, and stored in the RAM. The data may contain reference data used to determine whether to renew the leading edge portion of the sheet-like member 21.

The control unit 112 is connected with components, such as the vertical movement mechanism 106 for the manufacturing table 101, powder depositing apparatus 107, the laser light source 109, the scanner 110, the condensing lens 111, and the powder-storage-portion vertical movement mechanism 114; and controls operations of the components for performing processes of the additive manufacturing. That is, the control unit 112 executes the powder-layer forming process and the solidifying process.

In addition, the control unit 112 is connected with the sensor 130. The control unit 112 controls the operation of the sensor 130, acquires measurement data on the shape of the leading edge portion of the sheet-like member 21 from the sensor 130, and checks the shape of the leading edge portion.

In addition, the control unit 112 executes the renewal process for renewing the leading edge portion of the sheet-like member 21, by controlling the rollers 23, the fixing portions 24, and the cutting portions 25 of the powder depositing apparatus 107.

Method of Manufacturing Three-Dimensionally Shaped Object

Next, a method of manufacturing a three-dimensionally shaped object by using the additive manufacturing apparatus 1 will be described.

After the plate 102 is attached to the manufacturing table 101 of the additive manufacturing apparatus 1, the additive manufacturing apparatus 1 repeatedly deposits one solidified portion on another for forming a three-dimensionally shaped object on the plate 102.

Figure 6:
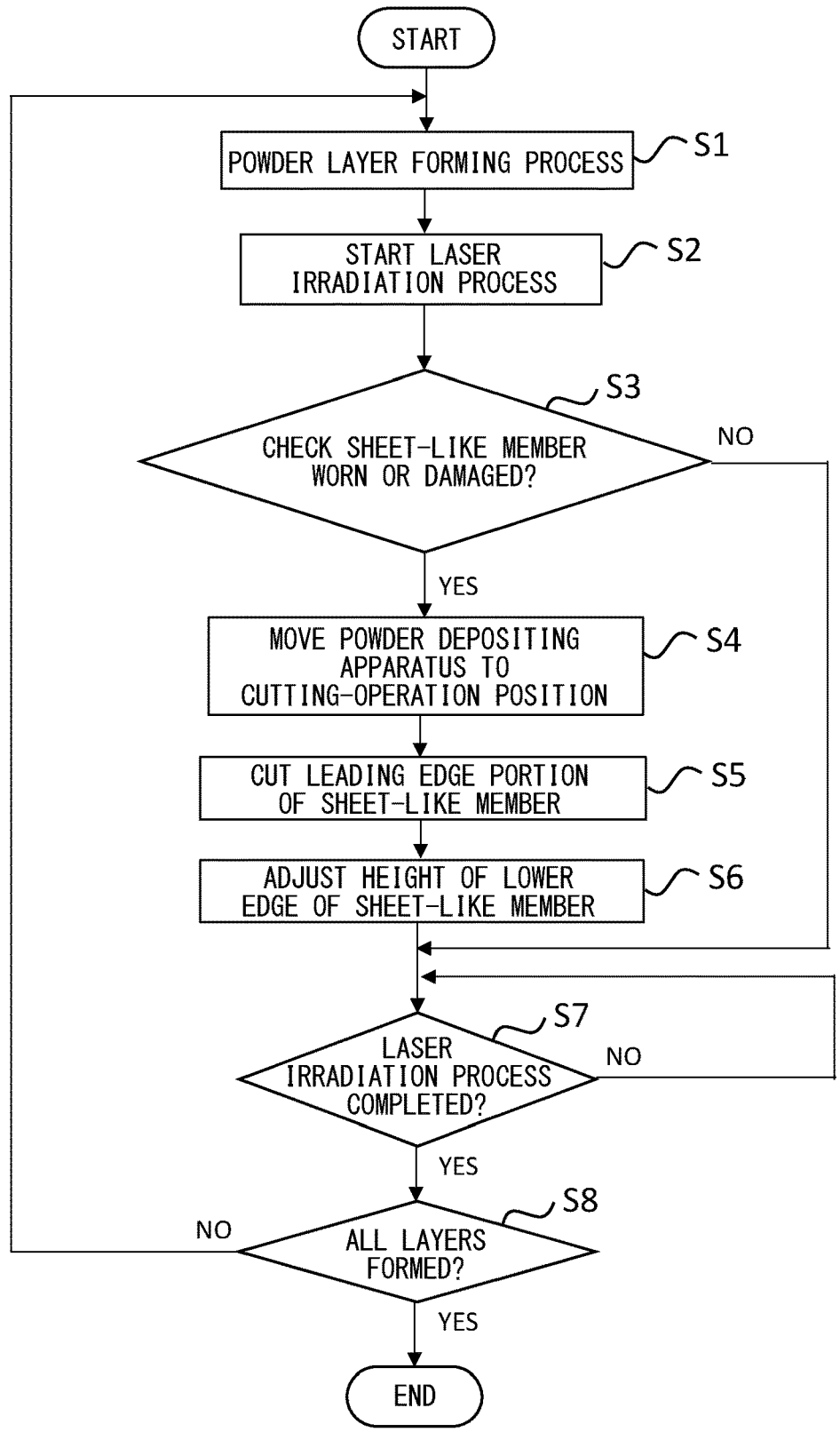
FIG. 6 is a flowchart for illustrating procedures for forming a three-dimensionally shaped object in the first embodiment.

FIG. 6 is a flowchart for illustrating procedures for forming a three-dimensionally shaped object.

When additive manufacturing is started, the control unit 112 executes a powder-layer forming process in Step S1 for forming a powder layer having a predetermined thickness. Specifically, the control unit 112 sends a command to the vertical movement mechanism 106 and causes the manufacturing table 101 to move to an initial position for performing the manufacturing operation.

Then, the control unit 112 causes the powder-storage-portion vertical movement mechanism 114 to lift the right or the left portion of the powder storage portion 113 for lifting the powder to a position higher than the deposition-height limiting line 201.

Then the control unit 112 sends a command to the powder depositing apparatus 107 and causes the powder depositing apparatus 107 to move along the movement guide 108 from the lifted powder storage portion 113 side toward the plate 102 in the positive or the negative direction in the X-axis. In this operation, the sheet-like member 21 is positioned in advance such that the height of the lower edge of the sheet-like member 21 is made equal to the height of the deposition-height limiting line 201 in the Z-axis. The sheet-like member 21 moves in a space above the plate 102 while pushing the powder located above the deposition-height limiting line 201, so that one layer of material powder having a predetermined thickness is formed on the plate 102. That is, a first powder-layer forming process is performed.

After forming the powder layer, the control unit 112 starts a solidifying process in Step S2. That is, the control unit 112 sends commands to the laser light source 109, the scanner 110, and the condensing lens 111; and causes them to irradiate a target portion of the material powder (to be solidified) with a laser beam for heating the portion. The laser beam emitted from the laser light source 109 scans the powder material in the X direction and the Y direction, via the scanner 110 in accordance with the shape of an object to be manufactured. The laser beam is focused on a very small portion of the powder layer by the condensing lens 111, and the locally heated portion of the powder layer is sintered or melted and solidified. Thus, the laser light source 109 is turned on and off while the powder layer is scanned by the laser beam via the scanner 110. In this manner, a desired portion of the powder layer is irradiated with the laser beam, and a solidified portion 116 is formed.

After starting the solidifying process in Step S2, the control unit 112 executes a checking process in Step S3 for checking the shape of the leading edge portion of the sheet-like member 21. That is, the control unit 112 sends a command to the powder depositing apparatus 107, causes the powder depositing apparatus 107 to move to the measurement position for the sensor 130, causes the sensor 130 to measure the shape of the sheet-like member 21, and acquires a measurement result. The control unit 112 compares the acquired measurement result with a prestored criterion, and determines whether the leading edge portion of the sheet-like member 21 is worn or damaged. Preferably, the criterion is set under preventive safety, not only for detecting that the wear or the damage of the leading edge portion is making it difficult to form a powder layer, but also for detecting that the wear or the damage of the leading edge portion might make it difficult to form a next powder layer.

If the control unit 112 determines that the leading edge portion of the sheet-like member 21 is worn or damaged (Step S3: YES), then the control unit 112 executes the steps S4 to S6 for the renewal process for the leading edge portion.

In Step S4, the control unit 112 sends a command to the powder depositing apparatus 107, and causes the powder depositing apparatus 107 to move from the measurement position for the sensor 130 to the cutting-operation space 122 (FIG. 5).

In Step S5, the control unit 112 sends a command to the powder depositing apparatus 107, and cuts the leading edge portion of the sheet-like member 21, as described with reference to FIG. 4B.

In Step S6, the control unit 112 sends a command to the powder depositing apparatus 107, and adjusts the height of the leading edge portion (lower edge) of the sheet-like member 21 and fixes the sheet-like member 21, as described with reference to FIGS. 4C and 4D.

Although not illustrated in the flowchart, an additional process may be executed after the renewal process for the leading edge portion, for measuring the shape of a renewed leading edge portion by using the sensor 130. In this case, if the renewed leading edge portion does not have an acceptable cut shape, the control unit 112 may execute the steps S4 to S6 again.

After completing the renewal process for the leading edge portion by executing the steps S4 to S6, the control unit 112 determines in Step S7 whether the laser irradiation process, started in Step S2, has been completed. If the laser irradiation process has not been completed (Step S7: NO), then the control unit 112 waits until the laser irradiation process is completed, while repeating Step S7.

In the above-described Step S3, if the control unit 112 determines that the leading edge portion of the sheet-like member 21 is neither worn nor damaged (Step S3: NO), then the control unit 112 proceeds to Step S7 and waits until the laser irradiation process is completed.

If the control unit 112 determines in Step S7 that the laser irradiation process on the powder layer is completed (Step S7: YES), then the control unit 112 proceeds to Step S8, and determines whether all the layers of the three-dimensionally shaped object have been formed (solidified).

If the control unit 112 determines that all the layers of the three-dimensionally shaped object have not yet been formed (solidified) (Step S8: NO), then the control unit 112 returns to Step S1, and executes the powder-layer forming process (second powder-layer forming process) for forming the next solidified layer.

After that, the control unit 112 executes Step S2 and the following steps, and completes the laser irradiation process.

The control unit 112 repeats these processes until the control unit 112 determines in Step S8 that all the layers of the three-dimensionally shaped object have been formed (solidified).

If the control unit 112 determines in Step S8 that all the layers of the three-dimensionally shaped object have been formed (solidified) (Step S8: YES), then the control unit 112 ends the additive manufacturing.

Thus, when a three-dimensionally shaped object (product) is manufactured by repeating formation and solidification of a powder layer, the present embodiment prevents the deterioration of accuracy in the manufacturing or the stop of the manufacturing operation due to the wear or the damage of the material supplying unit, and allows the additive manufacturing to be reliably continued. As a result, three-dimensionally shaped objects having high accuracy in shape can be continuously manufactured with a high manufacturing yield.

In the present embodiment, while a powder layer is irradiated with a laser beam, the change in shape of the leading edge portion (lower edge) of the sheet-like member 21 is measured by using the sensor, and whether to renew the leading edge portion (i.e. the portion of the sheet-like member 21 that contacts the powder) is determined. Since the measurement is performed in parallel with the laser irradiation process for the solidification, the measurement does not extend a process time taken for manufacturing the three-dimensionally shaped object. In addition, since whether to renew the leading edge portion is determined depending on the measurement, the cutting range (disposal) of the sheet-like member 21 can be reduced to an extent necessary and sufficient.

Second Embodiment

Additive Manufacturing Apparatus

Next, a second embodiment of the present invention will be described. The description for a component identical to a component of the first embodiment will be omitted.

An overall configuration of an additive manufacturing apparatus of the present embodiment is basically the same as that of the first embodiment. However, the present embodiment differs from the first embodiment in a method of manufacturing a three-dimensionally shaped object, that is, a method of controlling the additive manufacturing apparatus. Specifically, in the present embodiment, the measurement for the wear or the damage of the sheet-like member 21 by the sensor 130 is not performed. Thus, in the present embodiment, the sensor 130 (FIG. 5) may not necessarily be disposed in the additive manufacturing apparatus. However, the sensor 130 may be disposed for performing the measurement process (checking process) in which the shape of a cut portion of the sheet-like member 21 is checked after the sheet-like member 21 is cut.

Method of Manufacturing Three-Dimensionally Shaped Object

Figure 7:
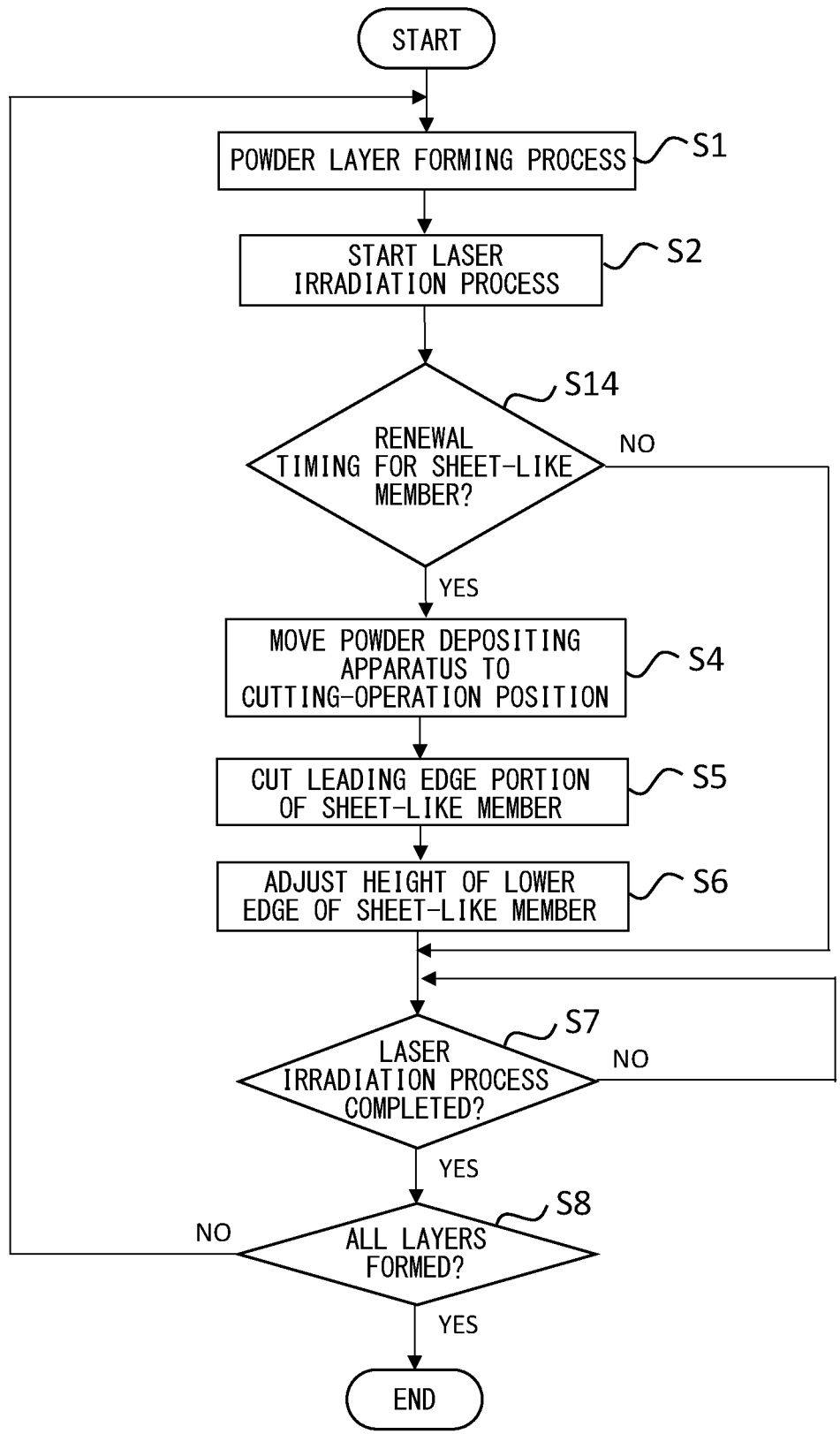
FIG. 7 is a flowchart for illustrating procedures for forming a three-dimensionally shaped object in a second embodiment.

FIG. 7 is a flowchart for illustrating procedures for forming a three-dimensionally shaped object in the second embodiment. A process identical to a process of the first embodiment is given an identical numeral, and the detailed description thereof will be omitted.

A powder depositing apparatus of the present embodiment also includes a mechanism that automatically renews the leading edge portion of the sheet-like member 21 before the leading edge portion of the sheet-like member 21 is worn to the extent that the quality of the manufactured object deteriorates or the manufacturing becomes difficult to continue.

The renewal of the leading edge portion of the sheet-like member 21 means that a portion of the sheet-like member 21 having been in contact with the powder in a powder-layer forming process is replaced with a new (unworn) portion of the sheet-like member 21 having not been in contact with the powder.

In the first embodiment, after starting the laser irradiation process in Step S2, the control unit 112 checks the shape of the leading edge portion of the sheet-like member 21 in Step S3. In addition, if the control unit 112 determines that the degree of wear or damage of the leading edge portion of the sheet-like member 21 is larger than a predetermined degree, then the control unit 112 performs the renewal process for the leading edge portion.

In the second embodiment, however, data on a timing for executing the renewal process for the leading edge portion is prestored in the control unit 112, and the control unit 112 executes the renewal process for the leading edge portion at the timing.

FIG. 7 is a flowchart for illustrating procedures for forming a three-dimensionally shaped object in the second embodiment. After starting additive manufacturing and executing Step S1 and Step S2 as in the first embodiment, the control unit 112 determines in Step S14 whether the timing for renewing the leading edge portion of the sheet-like member 21 is reached. The data on the timing for renewing the leading edge portion of the sheet-like member 21 is prestored in the control unit 112. The timing for renewing the leading edge portion may be a point of time at which a predetermined number of layers has been formed, or a point of time at which a predetermined number of powder-layer forming processes has been executed. In addition, because a projecting portion, which wears the leading edge portion of the sheet-like member 21, is more likely produced as the area of the solidified layer becomes larger, the leading edge portion may be renewed every time a total value of areas of solidified layers reaches a predetermined value.

If the control unit 112 determines that the renewal timing is reached (S14: YES), then the control unit 112 renews the leading edge portion of the sheet-like member 21 by executing the steps S4 to S6, as in the first embodiment. If the control unit 112 determines that the renewal timing is not reached (S14: NO), then the control unit 112 proceeds to Step S7.

In the present embodiment, since the sensor for measuring the wear or the damage of the sheet-like member 21 is not disposed, the cost of the additive manufacturing apparatus can be reduced.

Third Embodiment

Additive Manufacturing Apparatus

Next, a third embodiment of the present invention will be described. The detailed description for a component identical to a component of the first embodiment will be omitted.

An overall configuration of an additive manufacturing apparatus of the present embodiment is basically the same as that of the first embodiment. However, the configuration of the powder depositing apparatus of the present embodiment differs from that of the first embodiment. As described with reference to FIG. 3, the powder depositing apparatus of the first embodiment uses the leading edge portion of the sheet-like member 21 as a blade.

Figure 8:
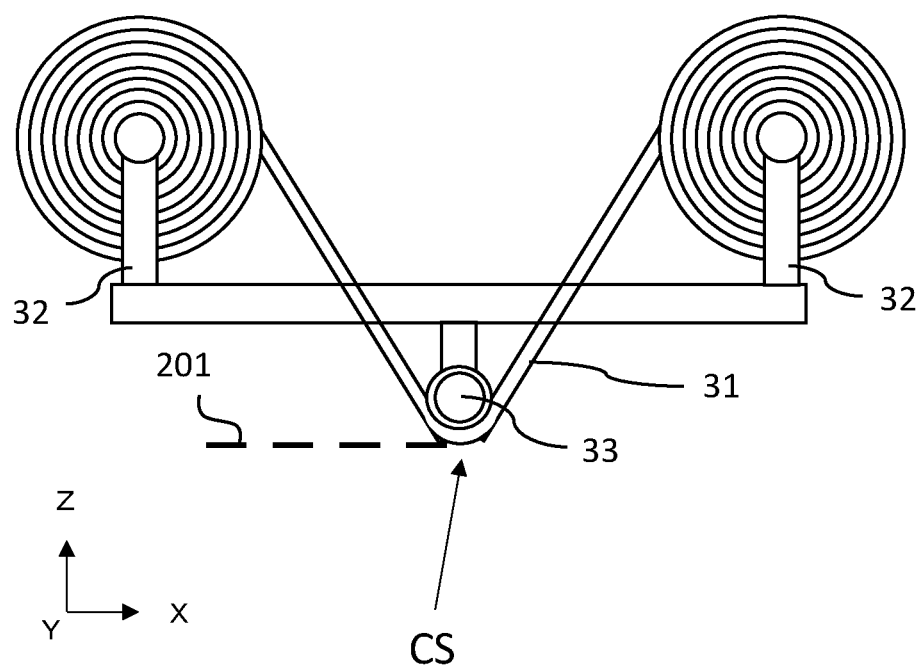
FIG. 8 is a partial cross-sectional view schematically illustrating a structure of a powder depositing apparatus of a third embodiment.

In the third embodiment, as illustrated in FIG. 8, the powder depositing apparatus of the additive manufacturing apparatus includes a sheet-like member 31, roll supports 32, and a roller 33. The left portion and the right portion of the sheet-like member 31 are wound like a roll, and each roll is supported by a corresponding one of the roll supports 32. In addition, a middle portion of the sheet-like member 31 is supported by the roller 33 in a downward direction. The roller 33 is disposed such that a contact surface CS (i.e. bottom portion) of the sheet-like member 31 stretched between the roll supports 32 has a height equal to the height of the deposition-height limiting line 201. The sheet-like member 31 supported by the roller 33 pushes a pile of material powder toward a direction along the X-axis and forms a powder layer whose top surface is flat and whose thickness is constant. Since the thickness of a powder layer is determined by the height of the contact surface CS of the sheet-like member 31 that pushes the powder, the sheet-like member 31 is a thickness determining member that determines the thickness of the powder layer.

The sheet-like member 31 is supported by the roller 33 such that a portion of the sheet-like member 31 located in the vicinity of a lower portion of the circumference of the roller 33 is fixed to the roller 33. When a powder layer is formed, one portion of the sheet-like member 31, that is, the contact surface CS of the sheet-like member 31 keeps in contact with the powder.

The sheet-like member 31 has rigidity necessary for regulating the thickness of each powder layer. In addition, the sheet-like member 31 is made of a material that allows a contact portion of the sheet-like member 31 to deform in accordance with the shape of a projecting portion (undesirably formed on the three-dimensionally shaped object) when contacting the projecting portion. That is, the sheet-like member 31 is made of elastic material, for example. In addition, for preventing the projecting portion from directly damaging the roller 33, the sheet-like member 31 has a sufficient thickness that allows the sheet-like member 31 to deform and contract by the height of the projecting portion. Specifically, the sheet-like member 21 is made of an elastic material containing a main component such as silicone rubber or elastomer. Thus, the sheet-like member 31, which is an elastic member, has a contact portion and a non-contact portion formed adjacent to the contact portion. The contact portion is a portion that contacts the projecting portion, and has flexibility that allows the contact portion to deform in accordance with the shape of the projecting portion. The non-contact portion is a portion that does not contact the projecting portion, and has rigidity that causes the non-contact portion to hardly deform. Thus, even if a projecting portion is formed, the flatness of a powder layer formed around the projecting portion by spreading the powder is kept by using the sheet-like member 31.

In the present embodiment, a sensor is disposed as a checking portion for measuring the shape of the contact surface CS. The sensor measures the shape of the whole of the contact surface CS of the sheet-like member 31 in the Y direction. The sensor may be an image sensor, or may be a combination of an image sensor and a Y-direction scanning mechanism. In the former case, the image sensor picks up an image of the whole of the contact surface CS in the Y direction; in the latter case, the image sensor picks up an image of one portion of the contact surface CS in the Y direction. The sensor may not be an image sensor, but be a distance sensor or an ultrasonic sensor.

Method of Manufacturing Three-Dimensionally Shaped Object

Figure 9:
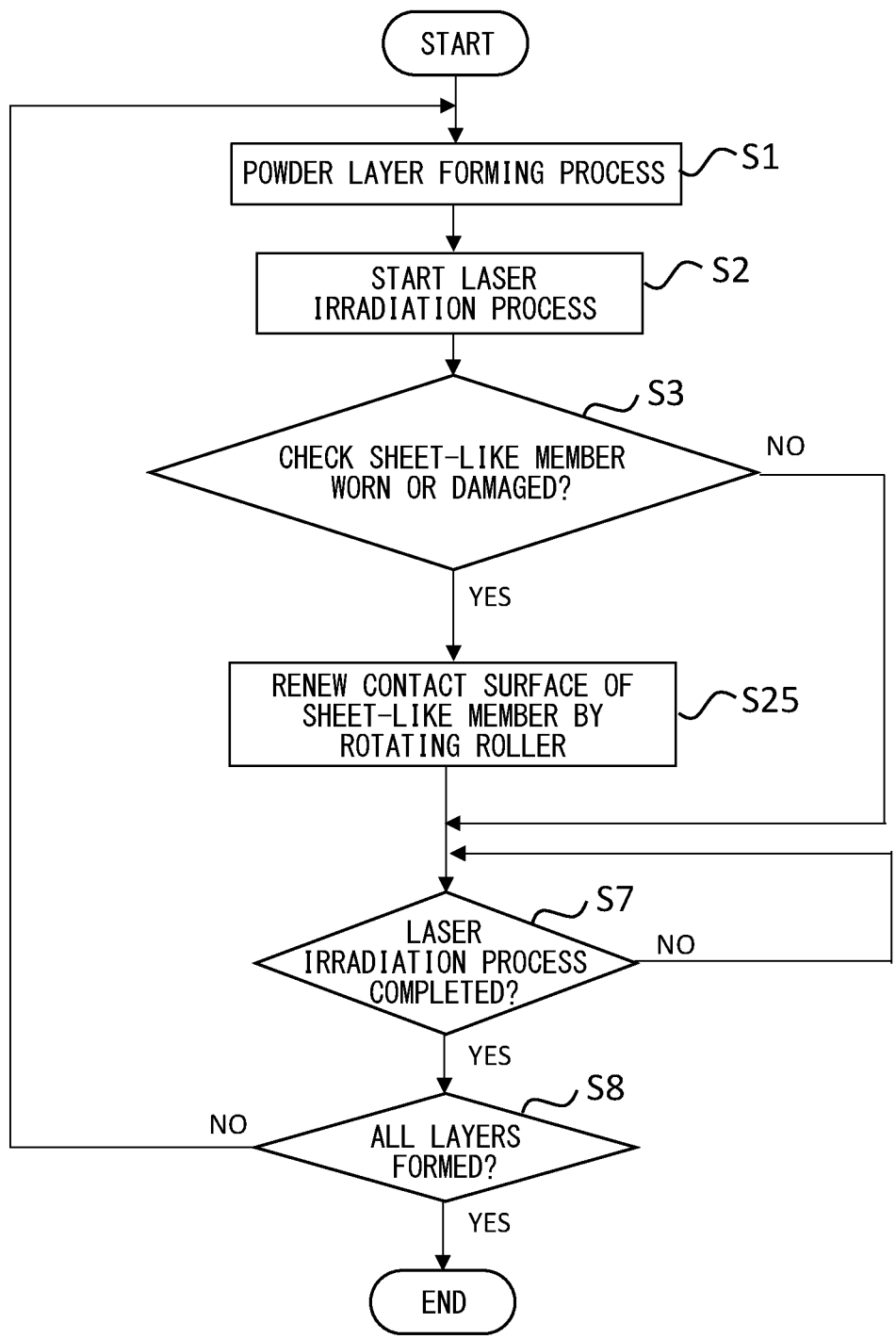
FIG. 9 is a flowchart for illustrating procedures for forming a three-dimensionally shaped object in the third embodiment.

FIG. 9 is a flowchart for illustrating procedures for forming a three-dimensionally shaped object in the third embodiment. A process identical to a process of the first embodiment is given an identical numeral, and the detailed description thereof will be omitted.

The powder depositing apparatus of the present embodiment includes a mechanism that automatically renews the contact surface CS of the sheet-like member 31 before the contact surface CS of the sheet-like member 31 is worn to the extent that the quality of the manufactured object deteriorates or the manufacturing becomes difficult to continue. The renewal of the contact surface CS of the sheet-like member 31 means that a portion of the sheet-like member 31 having been in contact with the powder in a powder-layer forming process is replaced with a new (unworn) portion of the sheet-like member 31 having not been in contact with the powder.

In the present embodiment, after starting the laser irradiation process in Step S2, the control unit 112 checks the shape of the contact surface CS of the sheet-like member 31 in Step S3. The control unit 112 compares an acquired measurement result with a prestored criterion, and determines whether the contact surface CS of the sheet-like member 31 is worn or damaged. Preferably, the criterion is set under preventive safety, not only for detecting that the wear or the damage of the contact surface CS is making it difficult to form a powder layer, but also for detecting that the wear or the damage of the contact surface CS might make it difficult to form a next powder layer. Then, if the control unit 112 determines depending on a check result that the sheet-like member 31 is worn or damaged (S3: YES), then the control unit 112 executes the renewal process for the contact surface CS (S25).

For renewing the contact surface CS, the control unit 112 releases the sheet-like member 31 having been fixed in the vicinity of the lower portion of the circumference of the roller 33, and causes the two roll supports 32, which serve as a moving portion, to cooperate with each other and rotate the rolls. For example, if the rolls are rotated clockwise in FIG. 8, the portion of the sheet-like member 31 having been in contact with the powder moves rightward, and a portion of the sheet-like member 31 having not been in contact with the powder moves from the left roll side to the lower portion of the circumference of the roller 33. With this operation, the portion (new contact surface CS) of the sheet-like member 31 having not been in contact with the powder moves to a position in which the new contact surface CS can contact the powder in the next powder-layer forming process. That is, the new contact surface CS moves to a position directly below the roller 33.

The roll supports 32 may be driven by any mechanism as long as the sheet-like member 31 can be drawn and fed. For example, a rotary portion of each roll supports 32 may be rotated by a desired angle by an ordinary motor, such as a stepping motor, that generates torque. In addition, the mechanism may include an encoder that detects a rotational position of the rotary portion of each roll supports 32, or may include a clutch or a brake that stops the rotation and fixes the rotary portion of each roll supports 32.

After the sheet-like member 31 moves in this manner, the sheet-like member 31 is fixed in the vicinity of the lower portion of the circumference of the roller 33, and the renewed portion of the sheet-like member 31 serves as the contact surface CS.

Thus, when a three-dimensionally shaped object (product) is manufactured by repeating formation and solidification of a powder layer, the present embodiment prevents the deterioration of accuracy in the manufacturing or the stop of the manufacturing operation due to the wear or the damage of the material supplying unit, and allows the additive manufacturing of the product to be reliably continued. As a result, three-dimensionally shaped objects having high accuracy in shape can be continuously manufactured with a high manufacturing yield.

In the present embodiment, while a powder layer is irradiated with a laser beam, the change in shape of the contact surface CS of the sheet-like member 31 is measured by using the sensor, and whether to renew the contact surface CS (i.e. the portion of the sheet-like member 31 that contacts the powder) is determined. Since the measurement is performed in parallel with the laser irradiation process, the measurement does not extend a process time taken for manufacturing the three-dimensionally shaped object. In addition, since whether to renew the contact surface CS is determined depending on the measurement, the consumption of the sheet-like member 31 can be reduced to an extent necessary and sufficient.

In addition, in the present embodiment, since the sheet-like member is not cut unlike the first embodiment, the cutting-operation space 122 is not needed, so that the additive manufacturing apparatus can be downsized.

Fourth Embodiment

Additive Manufacturing Apparatus

Next, a fourth embodiment of the present invention will be described. The description for a component identical to a component of the third embodiment will be omitted.

An overall configuration of an additive manufacturing apparatus of the present embodiment is basically the same as that of the third embodiment. However, the present embodiment differs from the third embodiment in a method of manufacturing a three-dimensionally shaped object, that is, a method of controlling the additive manufacturing apparatus. Specifically, in the present embodiment, the measurement for the wear or the damage of the sheet-like member 31 by the sensor is not performed. Thus, in the present embodiment, the sensor may not necessarily be disposed in the additive manufacturing apparatus. However, the sensor may be disposed for performing the measurement process (checking process), in which the shape of the contact surface CS is checked after the sheet-like member 31 is renewed.

Method of Manufacturing Three-Dimensionally Shaped Object

Figure 10:
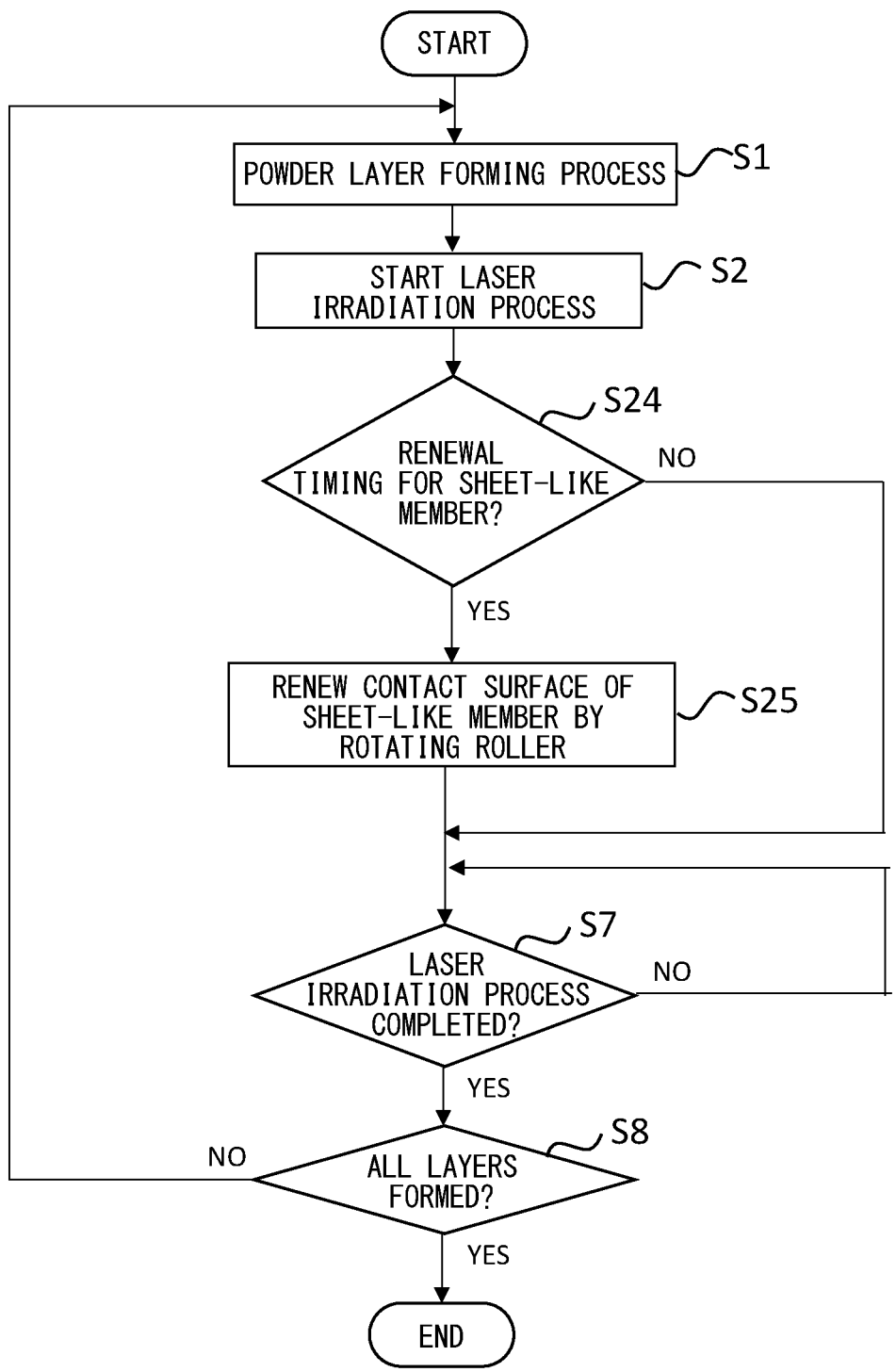
FIG. 10 is a flowchart for illustrating procedures for forming a three-dimensionally shaped object in a fourth embodiment.

FIG. 10 is a flowchart for illustrating procedures for forming a three-dimensionally shaped object in the fourth embodiment. A process identical to a process of the third embodiment is given an identical numeral, and the detailed description thereof will be omitted.

The powder depositing apparatus of the present embodiment also includes a mechanism that automatically renews the contact surface CS of the sheet-like member 31 before the contact surface CS of the sheet-like member 31 is worn to the extent that the quality of the manufactured object deteriorates or the manufacturing becomes difficult to continue. The renewal of the contact surface CS of the sheet-like member 31 means that a portion of the sheet-like member 31 having been in contact with the powder in a powder-layer forming process is replaced with a new (unworn) portion of the sheet-like member 31 having not been in contact with the powder.

In the third embodiment, after starting the laser irradiation process in Step S2, the control unit 112 checks the shape of the contact surface CS of the sheet-like member 31 in Step S3. Then, if the control unit 112 determines that the sheet-like member 31 is worn or damaged, then the control unit 112 executes the renewal process for the contact surface CS.

In the fourth embodiment, however, data on a timing for executing the renewal process for the contact surface CS is prestored in the control unit 112, and the control unit 112 executes the renewal process for the contact surface CS at the timing.

FIG. 10 is a flowchart for illustrating procedures for forming a three-dimensionally shaped object in the fourth embodiment. After starting additive manufacturing and executing Step S1 and Step S2 as in the third embodiment, the control unit 112 determines in Step S24 whether the timing for renewing the contact surface CS of the sheet-like member 31 is reached. The data on the timing for renewing the contact surface CS of the sheet-like member 31 is prestored in the control unit 112. The timing for renewing the contact surface CS may be a point of time at which a predetermined number of layers has been formed, or a point of time at which a predetermined number of powder-layer forming processes has been executed. In addition, because a projecting portion, which wears the contact surface CS of the sheet-like member 31, is more likely produced as the area of the solidified layer becomes larger, the contact surface CS may be renewed every time a total value of areas of solidified layers reaches a predetermined value.

If the control unit 112 determines that the renewal timing is reached (S24: YES), then the control unit 112 renews the contact surface CS of the sheet-like member 31 by executing Step S25, as in the third embodiment. If the control unit 112 determines that the renewal timing is not reached (S24: NO), then the control unit 112 proceeds to Step S7.

In the present embodiment, since the sensor for measuring the wear or the damage of the sheet-like member 31 is not disposed, the cost of the additive manufacturing apparatus can be reduced.

Fifth Embodiment

Additive Manufacturing Apparatus

Figure 11:
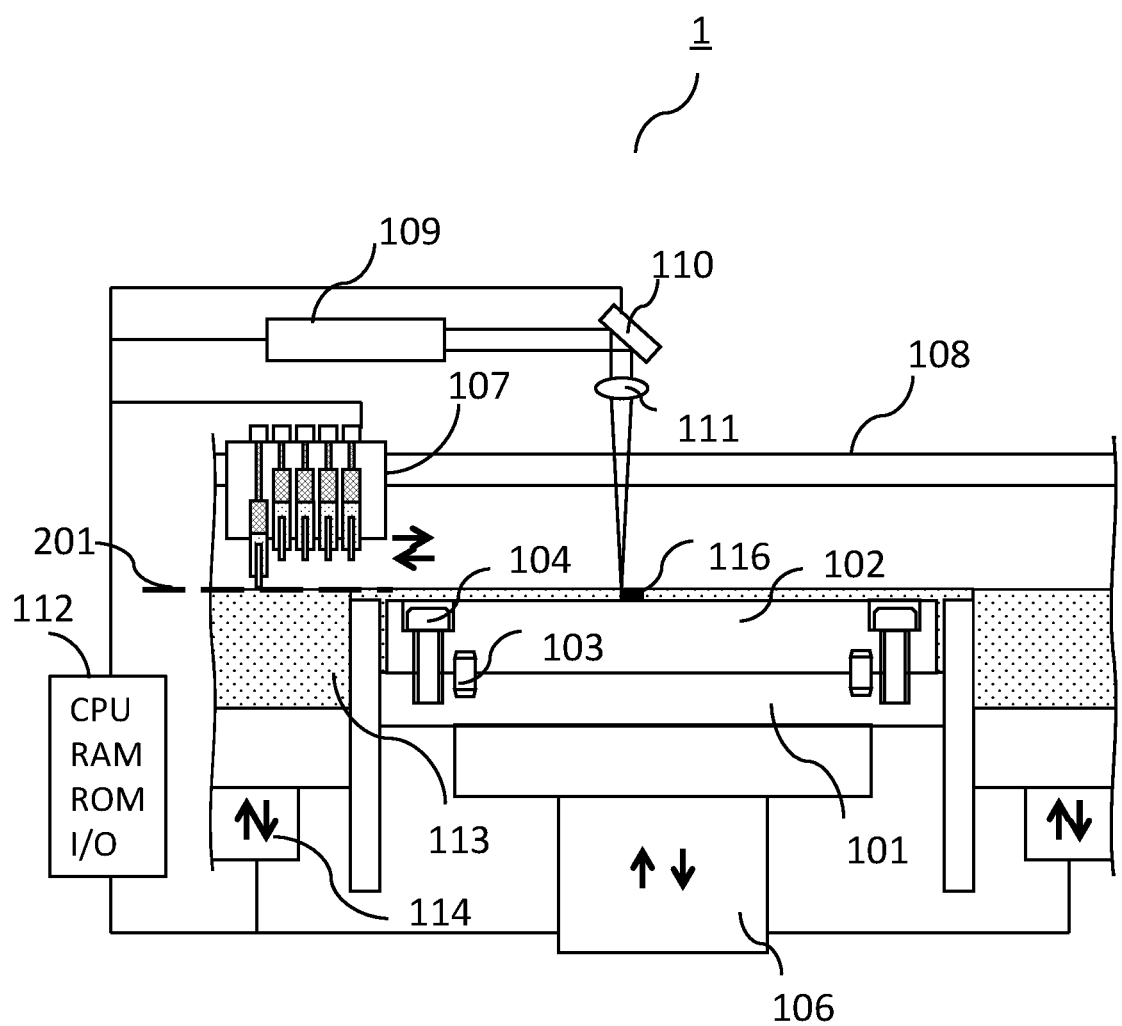
FIG. 11 is a schematic diagram illustrating a configuration of an additive manufacturing apparatus of a fifth embodiment.

With reference to FIG. 11, an additive manufacturing apparatus 1 of the present embodiment will be described. FIG. 11 is a schematic diagram for illustrating a configuration of the additive manufacturing apparatus 1. A component identical to a component of the first embodiment is given an identical reference numeral, and the description thereof will be omitted. The additive manufacturing apparatus 1 of the present embodiment differs from the additive manufacturing apparatus 1 of the first embodiment illustrated in FIG. 1, in the configuration of the powder depositing apparatus 107.

Figure 12:
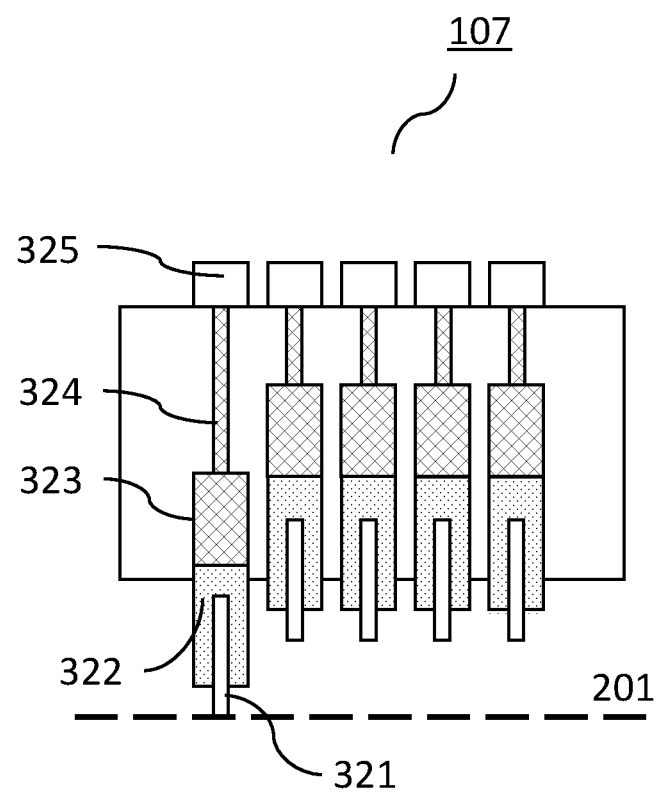
FIG. 12 is a partial cross-sectional view schematically illustrating a structure of a powder depositing apparatus of the fifth embodiment.

FIG. 12 is a partial cross-sectional view schematically illustrating a structure of a powder depositing apparatus 107 of the present embodiment.

As illustrated in FIG. 12, the powder depositing apparatus 107 includes a plurality of holding portions 322 that holds sheet-like members 321. Thus, the powder depositing apparatus 107 can replace a worn or damaged sheet-like member 321 with a new sheet-like member 321 in a sequential manner. The sheet-like member 321 serves as a blade that pushes a pile of material powder toward a direction along the X-axis and forms a powder layer whose top surface is flat and whose thickness is constant.

Since the thickness of a powder layer is determined by the height of a lower edge portion of the sheet-like member 321, the sheet-like member 321 is a thickness determining member that determines the thickness of the powder layer. Thus, even if a projecting portion is formed, the flatness of a powder layer formed around the projecting portion by spreading the powder is kept by using the sheet-like member 321 made of the same elastic material as that of the sheet-like member of the first embodiment.

However, as described in the first embodiment, the wear resistance of the sheet-like member 321 and the tear resistance obtained when the sheet-like member 321 is damaged are not so high. Thus, if the sheet-like member 321 repeatedly rubs against the powder and projecting portions, the sheet-like member 321 will be worn or damaged before the completion of the manufacturing. Consequently, the quality of the manufactured object may deteriorate, or the manufacturing may become difficult to continue.

For this reason, the powder depositing apparatus 107 of the present embodiment includes a mechanism that automatically changes a sheet-like member before the sheet-like member is worn to the extent that the quality of the manufactured object deteriorates or the manufacturing becomes difficult to continue.

As illustrated in FIG. 12, the sheet-like member 321 is nipped and held by the holding portion 322. The holding portion 322 is joined with a joint portion 323. The joint portion 323 is supported by a linear-motion shaft 324, which can be vertically moved in the Z direction by a driving source 325.

The driving source 325 may be any mechanism as long as the mechanism can move the sheet-like member 321 vertically. For example, the mechanism may be a piston mechanism that controls the movement of the sheet-like member 321 by using air pressure or oil pressure, or a mechanism that uses a rack and a pinion and converts the rotary motion of a component, such as a motor, to the linear motion.

Note that although the powder depositing apparatus 107 of FIG. 12 has five sheet-like members 321, the number of the sheet-like members 321 is not limited to five as long as the powder depositing apparatus 107 have a plurality of sheet-like members 321. The powder depositing apparatus 107 has only to have at least a first sheet-like member and a second sheet-like member, or may have more than five sheet-like members.

Figure 13:
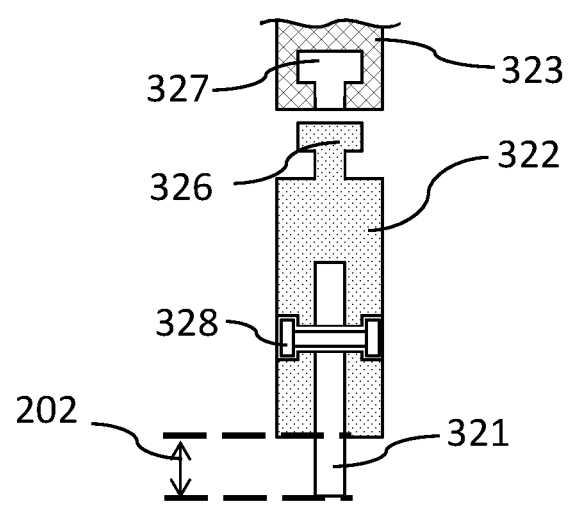
FIG. 13 is a partial cross-sectional view schematically illustrating a structure of a holding portion of the fifth embodiment.

FIG. 13 is a partial cross-sectional view schematically illustrating the holding portion 322 and its surroundings of the present embodiment.

As illustrated in FIG. 13, the holding portion 322 includes a convex portion 326, and the joint portion 323 includes a concave portion 327. The convex portion 326 and the concave portion 327 are formed so that the convex portion 326 can fit in the concave portion 327 for assembling and fixing the holding portion 322 and the joint portion 323 to each other. The concave portion may be formed in the holding portion 322, and the convex portion may be formed on the joint portion 323.

The convex portion 326 and the concave portion 327 may have any structure as long as they can easily assemble the holding portion 322 and the joint portion 323 to each other. For example, the holding portion 322 and the joint portion 323 may be fixed to or separated from each other by using a method that joins or separates them by using air pressure, oil pressure, or magnetic force when receiving a signal from the control unit 112.

The holding portion 322 nips and holds the sheet-like member 321, and the sheet-like member 321 is fixed to the holding portion 322 via fixing parts 328. The fixing parts 328 are a bolt and a nut, which apply force to the sheet-like member 321 in a direction in which the sheet-like member 321 is nipped. The sheet-like member 321 is assembled to the holding portion 322 before the additive manufacturing. In this operation, the amount of projection 202 of the sheet-like member 321 from the holding portion 322 is required to be adjusted with high accuracy. This is because the accuracy on the amount of projection 202 affects the accuracy of the deposition-height limiting line 201 illustrated in FIG. 11. Specifically, if the accuracy on the amount of projection 202 is insufficient, the powder layer will be formed poorly.

Figure 14A:
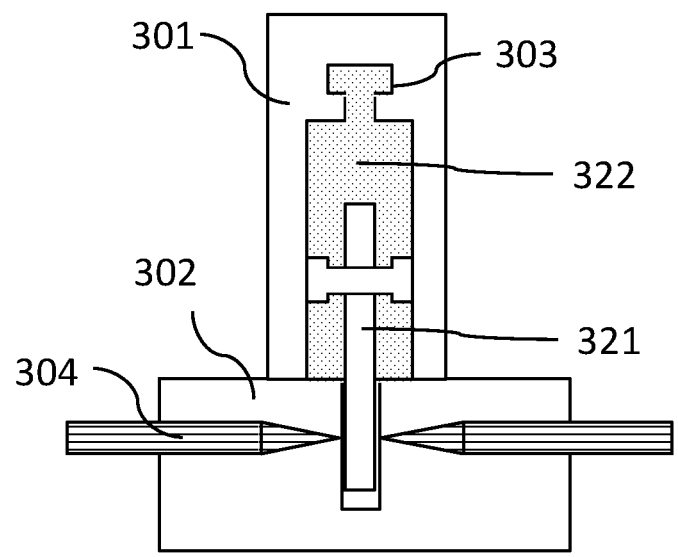
FIG. 14A is a diagram illustrating one example of a method that controls the amount of projection of the sheet-like member by adjusting the size of the sheet-like member.
Figure 14B:
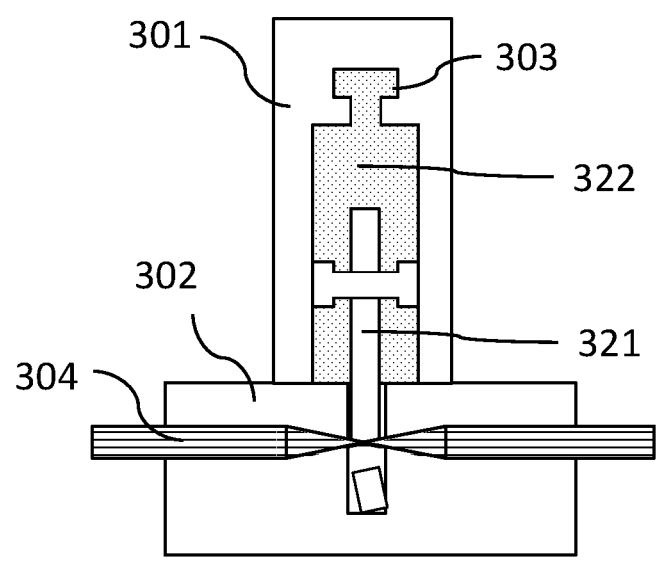
FIG. 14B is a diagram illustrating one example of the method that controls the amount of projection of the sheet-like member by adjusting the size of the sheet-like member.

FIGS. 14A and 14B are diagrams illustrating one example of a method that controls the amount of projection 202 by adjusting the size of the sheet-like member 321. With reference to FIGS. 14A and 14B, the method that controls the amount of projection 202 by adjusting the size of the sheet-like member 321 will be described.

As illustrated in FIG. 14A, the holding portion 322 that holds the sheet-like member 321 is fixed by using jigs 301 and 302 in advance. The jigs 301 and 302 are size adjusting tools for the sheet-like member 321.

The jig 301 includes a positioning portion 303 whose concave shape fits the convex shape of the holding portion 322, and the concave shape corresponds to the concave shape of the joint portion 323. The positioning portion 303 serves as a reference when the size of the sheet-like member 321 is adjusted.

As illustrated in FIG. 14B, the sheet-like member 321 is cut so that the size of the sheet-like member 321, that is, the amount of projection 202 of the sheet-like member 321 is equal to a predetermined length. The jig 302 includes a cutting portion 304 used to cut a leading edge portion of the sheet-like member. As illustrated in FIG. 14B, the cutting portion 304, which cuts the sheet-like member 321, may be a pair of cutters that moves to nip the sheet-like member 321. Note that the cutting portion 304 may not be a pair of cutters as long as the sheet-like member 321 is cut horizontally along a line for ensuring the flatness of powder layers. For example, the cutting portion may be a cutter and a plate-like member that nip and cut the sheet-like member 321, or may be a cutting mechanism such as a wire cutter.

Figure 15:
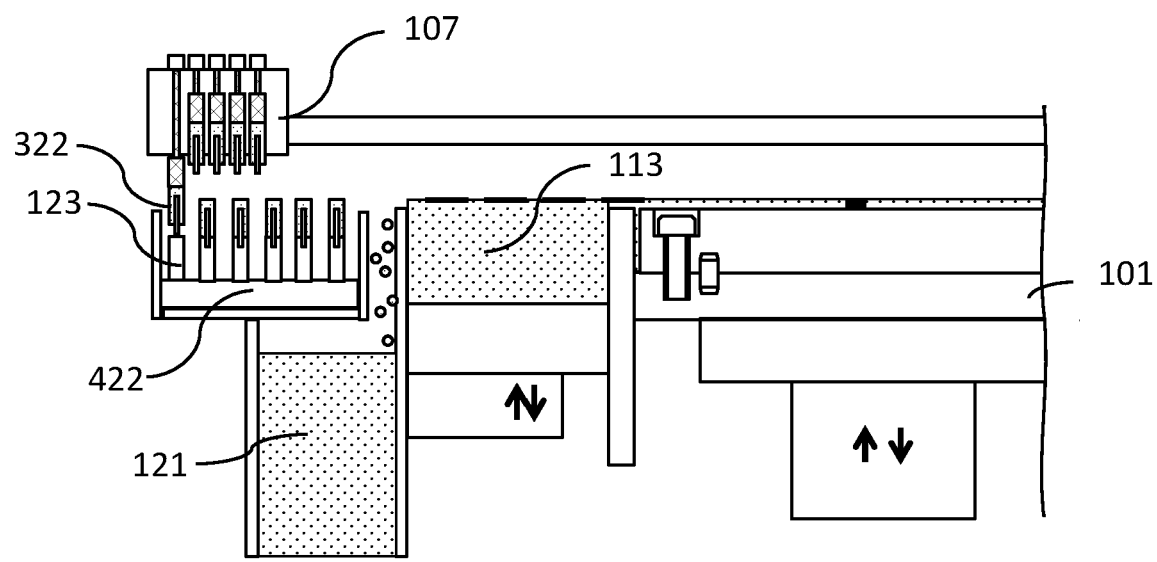
FIG. 15 is a schematic diagram for illustrating a position at which a holding portion is replaced, and an operation for replacing the holding portion.

FIG. 15 is a schematic diagram for illustrating the position and the operation in which a holding portion is replaced. FIG. 15 illustrates a left portion of the additive manufacturing apparatus 1, which is not illustrated in FIG. 11. An excess-powder collecting space 121 and a holding-portion replacing space 422 are disposed opposite to the manufacturing table 101 with respect to the powder storage portion 113.

The excess-powder collecting space 121 is a space for collecting excess powder. The excess powder is the powder left after the powder-layer forming process that forms a powder layer with a predetermined thickness, and conveyed to the excess-powder collecting space 121 by the powder depositing apparatus 107.

The collected powder may be disposed of, or may be reused through some treatment. However, if the collected powder contains no dust and has the same quality as that of the powder of the powder storage portion, it may be directly reused as the material powder.

The holding-portion replacing space 422 is a space where new holding portions are stored, and where holding portions 322 of the powder depositing apparatus 107 are replaced with new holding portions 322. For example, holding portions 322 of the powder depositing apparatus 107 are replaced with new holding portions 322 when all the sheet-like members of the powder depositing apparatus 107 are exhausted in the manufacturing, or when sheet-like members of the powder depositing apparatus 107 are automatically replaced with new sheet-like members in the start or the end of the manufacturing.

In the present embodiment, although not illustrated in FIG. 15, a sensor 130 is disposed in the holding-portion replacing space 422. The sensor 130 serves as a checking portion, and measures the shape of the sheet-like member 321. The sensor 130 measures the shape of the whole of the sheet-like member 321 in the Y direction. The sensor may be an image sensor, or may be a combination of an image sensor and a Y-direction scanning mechanism. In the former case, the image sensor picks up an image of the whole of the sheet-like member in the Y direction; in the latter case, the image sensor picks up an image of one portion of the sheet-like member in the Y direction. The sensor may not be an image sensor, but be a distance sensor or an ultrasonic sensor.

In the present embodiment, after a powder layer is formed and while the powder layer is irradiated with a laser beam, the shape of the sheet-like member 321 is measured by using the sensor 130, whether to change the sheet-like member 321 is determined, and the sheet-like member 321 is changed if necessary. Specifically, the control unit 112 processes an image captured by the sensor 130, determines whether the degree of deformation of the sheet-like member 321 caused by the wear or the damage exceeds a predetermined degree, and changes the sheet-like member 321 depending on a determination result. Note that whether to change the sheet-like member 321 may be determined, depending not on the shape of the sheet-like member 321, but on a condition of the surface of a powder layer.

In addition, after the sheet-like member 321 is changed, the shape of a new sheet-like member 321 may be measured by using the sensor 130 for checking that the new sheet-like member 321 has no defect and that the sheet-like member 321 has been changed without fail. For example, in a cutting operation for the sheet-like member 321 performed outside the apparatus by using the tools illustrated in FIG. 14A, there may be a case in which the shape of a cut portion of the sheet-like member 321 is unacceptable because there was dust between the cutter and the sheet-like member 321. The sensor 130 can detect such a case.

If it is necessary to change the sheet-like member 321, the control unit 112 can change the sheet-like member 321, before starting the next powder-layer forming operation. With reference to FIG. 15, an operation to replace the holding portion 322 will be described.

As illustrated in FIG. 15, the holding-portion replacing space 422 is disposed on the left side of the additive manufacturing apparatus 1. In the holding-portion replacing space 422, a holding portion that is holding a worn sheet-like member is replaced with another holding portion that is holding a new sheet-like member.

In the holding-portion replacing space 422, stands 123 are disposed, and each holding portion 322 is placed on a corresponding stand 123 with a predetermined orientation. First, the powder depositing apparatus 107 is moved so that a holding portion 322 to be replaced (i.e. holding portion that is holding a worn sheet-like member) is positioned above a stand 123 on which no holding portion is placed. Then the powder depositing apparatus 107 is vertically moved so that the holding portion 322 is put on the stand 123. Then the holding portion 322 is separated from the joint portion 323, and the holding portion 322 holding the worn sheet-like member is placed on the stand 123.

The powder depositing apparatus 107 is then moved so that the joint portion 323 is positioned above another stand 123 on which another holding portion 322 holding a new sheet-like member is placed. Then the holding portion 322 holding the new sheet-like member is attached to the joint portion 323 in the order reverse to the order in which the holding portion 322 holding the worn sheet-like member is detached. Note that although FIG. 15 illustrates the configuration in which the holding-portion replacing space 422 is disposed on the left side of the additive manufacturing apparatus, the holding-portion replacing space 422 may be disposed on either the right side or the left side of the additive manufacturing apparatus, or may be disposed on both sides of the additive manufacturing apparatus.

Method of Manufacturing Three-Dimensionally Shaped Object

Next, a method of manufacturing a three-dimensionally shaped object by using the additive manufacturing apparatus 1 of the present embodiment will be described.

After the plate 102 is attached to the manufacturing table 101 of the additive manufacturing apparatus 1, the additive manufacturing apparatus 1 forms a three-dimensionally shaped object on the plate 102 by repeatedly depositing one solidified portion on another.

Figure 16:
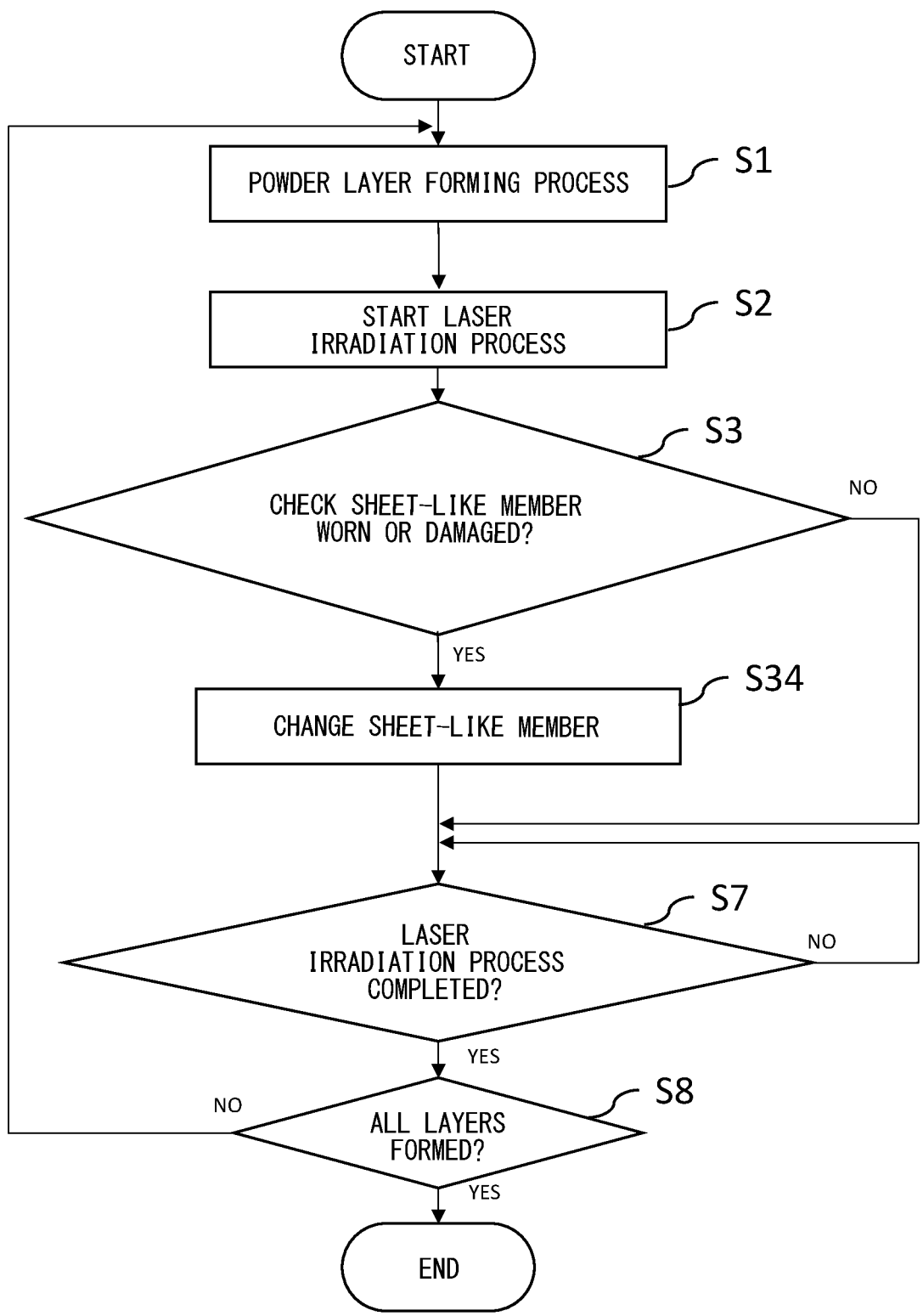
FIG. 16 is a flowchart for illustrating procedures for forming a three-dimensionally shaped object in the fifth embodiment.

FIG. 16 is a flowchart for illustrating procedures for forming a three-dimensionally shaped object.

When additive manufacturing is started, the control unit 112 executes a powder-layer forming process in Step S1 for forming a powder layer having a predetermined thickness. Specifically, the control unit 112 sends a command to the vertical movement mechanism 106 and causes the vertical movement mechanism 106 to move the manufacturing table 101 to an initial position for performing the manufacturing operation.

Then, the control unit 112 causes the powder-storage-portion vertical movement mechanism 114 to lift the right or the left powder storage portion 113 for lifting the powder to a position higher than the deposition-height limiting line 201.

Then the control unit 112 sends a command to the powder depositing apparatus 107 and causes the powder depositing apparatus 107 to move along the movement guide 108 from the lifted powder storage portion 113 side toward the plate 102 in the positive or the negative direction in the X-axis. In this operation, the sheet-like member 321 is positioned in advance such that the height of the lower edge of the sheet-like member 321 is made equal to the height of the deposition-height limiting line 201 in the Z-axis.

The sheet-like member 21 moves in a space above the plate 102 while pushing the powder located above the deposition-height limiting line 201, so that one layer of material powder having a predetermined thickness is formed on the plate 102.

After forming the powder layer, the control unit 112 starts a solidifying process in Step S2. That is, the control unit 112 sends commands to the laser light source 109, the scanner 110, and the condensing lens 111; and causes them to irradiate a target portion of the material powder (to be solidified) with a laser beam for heating the portion.

The laser beam emitted from the laser light source 109 scans the powder material in the X direction and the Y direction, via the scanner 110 in accordance with the shape of an object to be manufactured. The laser beam is focused on a very small portion of the powder layer by the condensing lens 111, and the locally heated portion of the powder layer is sintered or melted and solidified. Thus, the laser light source 109 is turned on and off while the powder layer is scanned by the laser beam via the scanner 110. In this manner, a desired portion of the powder layer is irradiated with the laser beam, and a solidified portion 116 is formed.

After starting the solidifying process in Step S2, the control unit 112 executes a checking process in Step S3 for checking the shape of the sheet-like member 321. That is, the control unit 112 sends a command to the powder depositing apparatus 107, causes the powder depositing apparatus 107 to move to the measurement position for the sensor 130, causes the sensor 130 to measure the shape of the sheet-like member 321, and acquires a measurement result.

The control unit 112 compares the acquired measurement result with a prestored criterion, and determines whether the sheet-like member 321 is worn or damaged. Preferably, the criterion is set under preventive safety, not only for detecting that the wear or the damage of the sheet-like member 321 is making it difficult to form a powder layer, but also for detecting that the wear or the damage of the sheet-like member 321 might make it difficult to form a next powder layer.

If the control unit 112 determines that the sheet-like member 321 is worn or damaged (Step S3: YES), then the control unit 112 executes Step S34 for changing the sheet-like member 321.

After changing the sheet-like member 321 by executing Step S34, the control unit 112 determines in Step S7 whether the laser irradiation process, started in Step S2, has been completed. If the laser irradiation process has not been completed (Step S7: NO), then the control unit 112 repeats Step S7 and waits until the laser irradiation process is completed.

In the above-described Step S3, if the control unit 112 determines that the sheet-like member 321 is neither worn nor damaged (Step S3: NO), then the control unit 112 proceeds to Step S7 and waits until the laser irradiation process is completed.

If the control unit 112 determines in Step S7 that the laser irradiation process for a powder layer is completed (Step S7: YES), then the control unit 112 proceeds to Step S8, and determines whether all the layers of the three-dimensionally shaped object have been formed (solidified).

If the control unit 112 determines that all the layers of the three-dimensionally shaped object have not yet been formed (solidified) (Step S8: NO), then the control unit 112 returns to Step S1, and executes the powder-layer forming process for forming the next solidified layer. After that, the control unit 112 executes Step S2 and the following steps, and completes the laser irradiation process.

The control unit 112 repeats these processes until the control unit 112 determines in Step S8 that all the layers of the three-dimensionally shaped object have been formed (solidified). If the control unit 112 determines in Step S8 that all the layers of the three-dimensionally shaped object have been formed (solidified) (Step S8: YES), then the control unit 112 ends the additive manufacturing.

Thus, when a three-dimensionally shaped object (product) is manufactured by repeating formation and solidification of a powder layer, the present embodiment prevents the deterioration of accuracy in the manufacturing or the stop of the manufacturing operation due to the wear or the damage of the material supplying unit, and allows the additive manufacturing of the product to be reliably continued. As a result, three-dimensionally shaped objects having high accuracy in shape can be continuously manufactured with a high manufacturing yield.

In the present embodiment, while a powder layer is irradiated with a laser beam, the change in shape of the sheet-like member 321 is measured by using the sensor, and whether to replace the sheet-like member is determined.

Sixth Embodiment

Next, a sixth embodiment of the present invention will be described. The description for a component identical to a component of the first embodiment or the fifth embodiment will be omitted.

Additive Manufacturing Apparatus

An overall configuration of an additive manufacturing apparatus of the present embodiment is basically the same as that of the fifth embodiment. However, the present embodiment differs from the fifth embodiment in a method of manufacturing a three-dimensionally shaped object, that is, a method of controlling the additive manufacturing apparatus. Specifically, in the present embodiment, the measurement for the wear or the damage of the sheet-like member 321 by the sensor is not performed. Thus, in the present embodiment, the sensor may not necessarily be disposed in the additive manufacturing apparatus.

Method of Manufacturing Three-Dimensionally Shaped Object

Figure 17:
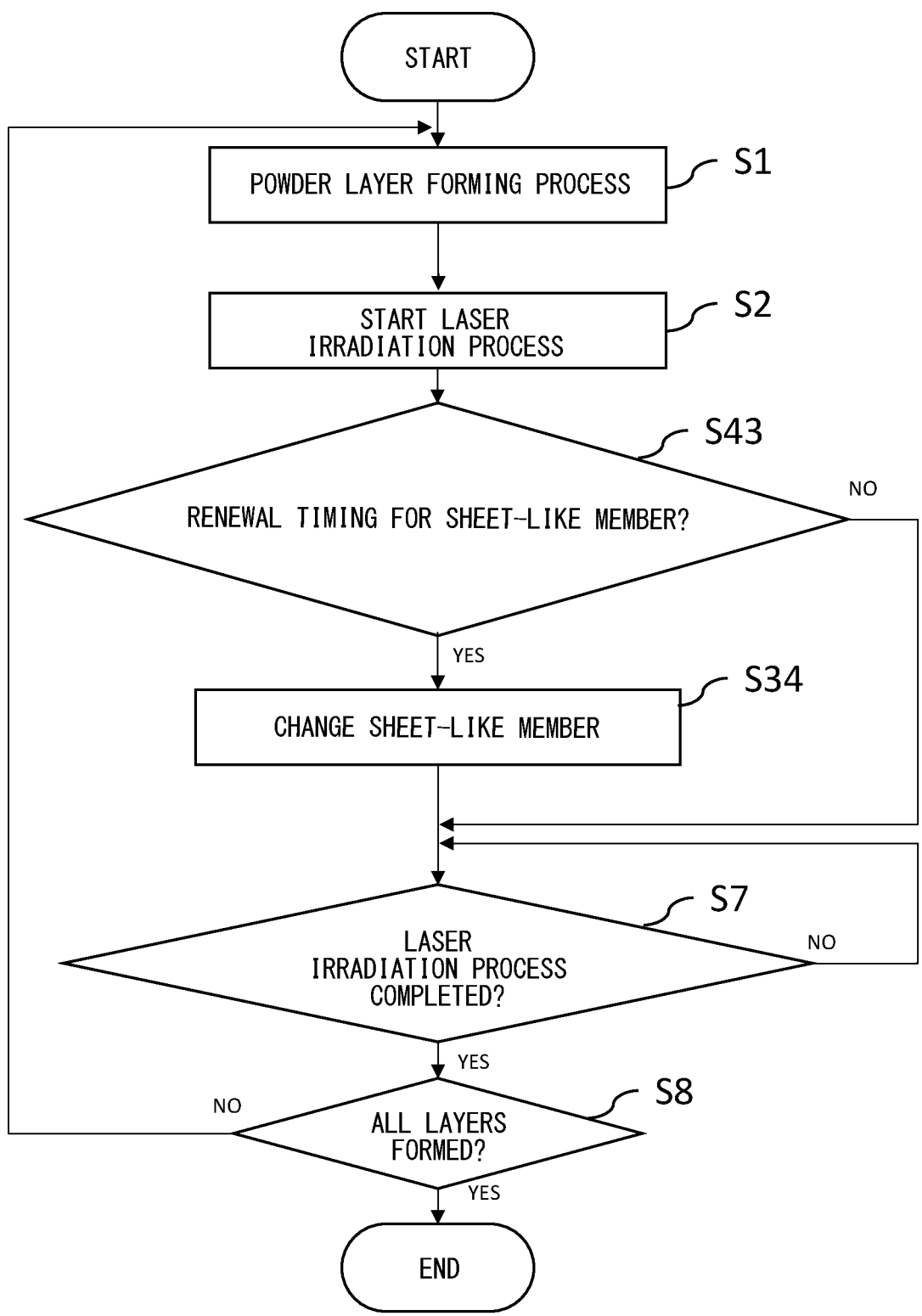
FIG. 17 is a flowchart for illustrating procedures for forming a three-dimensionally shaped object in a sixth embodiment.

FIG. 17 is a flowchart for illustrating procedures for forming a three-dimensionally shaped object in the sixth embodiment. A process identical to a process of the fifth embodiment is given an identical numeral, and the detailed description thereof will be omitted.

The powder depositing apparatus of the present embodiment also includes a mechanism that automatically changes the sheet-like member 321 before the sheet-like member 321 is worn to the extent that the quality of the manufactured object deteriorates or the manufacturing becomes difficult to continue. The change of the sheet-like member 321 means that a sheet-like member 321 having been in contact with the powder in a powder-layer forming process is replaced (changed) with a new (unworn) sheet-like member 321 having not been in contact with the powder.

In the fifth embodiment, after starting the laser irradiation process in Step S2, the control unit 112 checks the shape of the sheet-like member 321 in Step S3. In addition, if the control unit 112 determines that the degree of wear or damage of the sheet-like member 321 is larger than a predetermined degree, then the control unit 112 changes the sheet-like member 321.

In the sixth embodiment, however, data on a timing for changing the sheet-like member 321 is prestored in the control unit 112, and the control unit 112 changes the sheet-like member 321 at the timing.

After starting additive manufacturing and executing Step S1 and Step S2 as in the fifth embodiment, the control unit 112 determines in Step S43 whether the timing for changing the sheet-like member 321 is reached. The data on the timing for changing the sheet-like member 321 is prestored in the control unit 112. The timing for changing the sheet-like member 321 may be a point of time at which a predetermined number of layers has been formed, or a point of time at which a predetermined number of powder-layer forming processes has been executed. In addition, because a projecting portion, which wears the sheet-like member 321, is more likely produced as the area of the solidified layer becomes larger, the sheet-like member 321 may be changed every time a total value of areas of solidified layers reaches a predetermined value.

If the control unit 112 determines that the changing timing is reached (S43: YES), then the control unit 112 changes the sheet-like member 321 by executing Step S34, as in the fifth embodiment.

In contrast, if the control unit 112 determines that the changing timing is not reached (S43: NO), then the control unit 112 proceeds to Step S7.

In the present embodiment, since the sensor for measuring the wear or the damage of the sheet-like member 321 is not disposed, the cost of the additive manufacturing apparatus can be reduced.

Seventh Embodiment

Next, a seventh embodiment of the present invention will be described. The detailed description for a component identical to a component of the fifth embodiment will be omitted.

Additive Manufacturing Apparatus

An overall configuration of an additive manufacturing apparatus of the present embodiment is basically the same as that of the fifth embodiment. However, the configuration of the powder depositing apparatus of the present embodiment differs from that of the fifth embodiment. As described with reference to FIG. 12, the powder depositing apparatus of the fifth embodiment holds a plurality of sheet-like members in parallel, and performs the changing process by moving horizontally and vertically.

Figure 18:
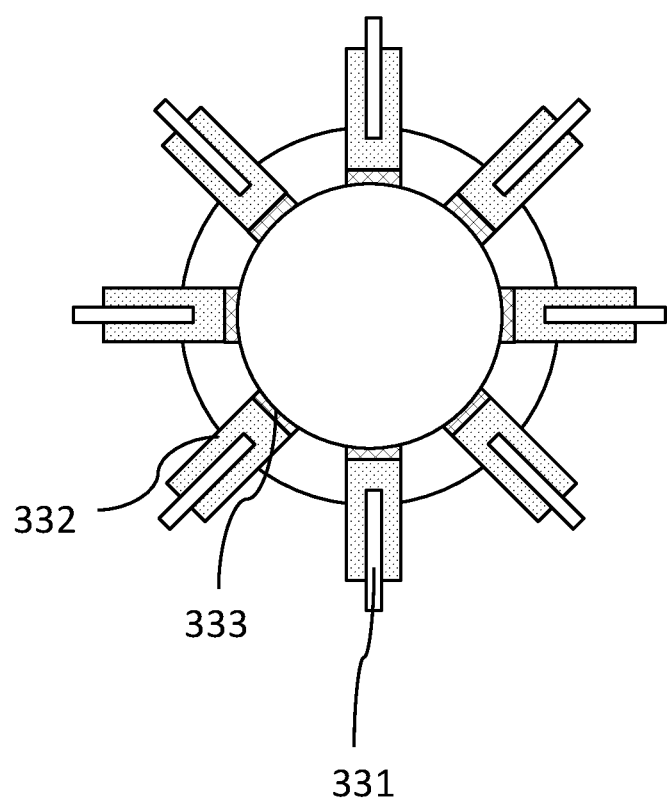
FIG. 18 is a partial cross-sectional view schematically illustrating a structure of a powder depositing apparatus of a seventh embodiment.

In the seventh embodiment, as illustrated in FIG. 18, the powder depositing apparatus of the additive manufacturing apparatus holds a plurality of sheet-like members 331 arranged radially. Each of the sheet-like members 331 is nipped and held by a holding portion 332. The holding portion 332 is joined with a joint portion 333.

In the present embodiment, unlike the powder depositing apparatus of the fifth embodiment, a sheet-like member is changed by rotating the radially-arranged sheet-like members. The basic configuration of the sheet-like member 331, the holding portion 332, and the joint portion 333 may be the same as that of the fifth embodiment, but the method of changing the sheet-like member is different from that of the fifth embodiment.

The driving mechanism (rotation portion) for rotary motion to change the sheet-like member 331 may be any mechanism as long as the mechanism can rotate a worn sheet-like member 331 or an unworn sheet-like member 331 to a changing-operation position.

For example, the sheet-like members 331 may be rotated by a desired angle by an ordinary motor, such as a stepping motor, that generates torque. In addition, the mechanism may include an encoder that detects a rotational position of a sheet-like member 331, or may include a clutch or a brake that stops the rotation and fixes the sheet-like members 331.

As described above, in the first to the seventh embodiments, the control unit 112 of the additive manufacturing apparatus controls the powder depositing apparatus 107. However, the powder depositing apparatus 107 may be an independent unit that has a control unit, which is different from the control unit 112 of the additive manufacturing apparatus. The control unit of the powder depositing apparatus 107 may operate in cooperation with the control unit 112 of the additive manufacturing apparatus, or may operate independently from the control unit 112 of the additive manufacturing apparatus.

EXAMPLES

Next, specific examples and a comparative example will be described. Example 1 to Example 4 are specific examples of the above-described embodiments. Comparative Example 1 is an example in which the manufacturing was performed using an additive manufacturing apparatus having a conventional blade and no automatic renewal function. In Example 1 to Example 3, a powder supplying mechanism of the second embodiment of the present invention was used. In Example 4, a powder supplying mechanism of the fourth embodiment was used.

The additive manufacturing processes of the examples and the comparative example were performed under the same conditions. Specifically, in the examples, the material powder used was SUS630 or AlSi10Mg having a maximum particle diameter of 35 μm or less and an average particle diameter of 20 μm. In Comparative Example 1, the same material powder as that for Example 1, Example 2, and Example 4 was used for performing the manufacturing.

The light source used was a fiber laser, and the atmosphere used in the manufacturing was an argon gas having a temperature of 30° C. and an oxygen concentration of 1,000 ppm. In addition, the thickness of each layer was 40 μm, and the total number of the layers was 2,500.

In Example 1 to Example 3 in which the powder supplying mechanism of the second embodiment was used, the leading edge portion of the sheet-like member was cut and renewed every time 100 layers were formed. Thus, the leading edge portion was renewed 24 times in total. In Example 4 in which the powder supplying mechanism of the fourth embodiment was used, the contact surface of the sheet-like member was renewed every time 100 layers were formed. Thus, the contact surface was renewed 24 times in total.

The manufactured three-dimensionally shaped object was a block used as a component of a mechanical apparatus and having a size of 100×100×100 mm. The three-dimensionally shaped object was manufactured in the same single-product manufacturing, in the examples and the comparative example. In the manufacturing, the laser beam had higher energy than that used for common heating processes. Thus, the laser beam melted the powder faster, resulting in a high-density object having less cavities.

The examples and the comparative example were evaluated on two evaluation items: wear of the sheet-like member and quality of manufactured object. The wear of the sheet-like member was evaluated by examining the amount of wear of the sheet-like member. Specifically, it was evaluated whether the amount of wear (which may affect the quality of manufactured object) is equal to or larger than 40 which is the thickness of a deposited single layer. If the amount of wear was less than 40 μm, an evaluation result "A" was given. In contrast, if the amount of wear was 40 μm or more, an evaluation result "B" was given.

In the quality of manufactured object, when a projecting portion was formed during the manufacturing process, the external appearance of the completed object was visually checked for determining whether a crack, a step, a projection or the like was formed due to a defective powder layer. Then, an evaluation result "A" was given if the external appearance was acceptable, and an evaluation result "B" was given if any crack, step, projection or the like was identified.

Table 1 collectively tabulates materials of the sheet-like member, materials of the powder, and the evaluation results on the examples and the comparative example.

TABLE 1

|  | EXAMPLE1 | EXAMPLE2 | EXAMPLE3 | EXAMPLE4 | COMPARATIVE EXAMPLE1 |
|---|---|---|---|---|---|
| MATERIAL OF SHEET-LIKE MEMBER | SILICONE RUBBER | ELASTOMER | SILICONE RUBBER | SILICONE RUBBER | SILICONE RUBBER |
| MATERIAL OF POWDER | SUS630 | SUS630 | AlSi10Mg | SUS630 | SUS630 |
| WEAR OF SHEET-LIKE MEMBER | A | A | A | A | B |
| QUALITY OF MANUFACTURED OBJECT | A | A | A | A | B |

As illustrated in Table 1, all the examples were not given the evaluation result "B", which will cause trouble in practical use. That is, in Example 1 to Example 4, the wear of the sheet-like member was less, and the quality of manufactured object was acceptable.

In contrast, in Comparative Example 1, the amount of wear of the sheet-like member exceeded 40 which is the thickness of one layer. Thus, the amount of wear of the sheet-like member may affect the quality of manufactured object. In addition, since the manufactured object was formed by using the worn sheet-like member, the shape of the object was defective due to insufficient accuracy in flatness and thickness of the powder layer. Thus, the accuracy in shape of the three-dimensionally shaped object was insufficient.

Modifications

The present invention is not limited to the above-described embodiments and examples, and can be modified or combined within the technical spirit of the present invention. For example, the additive manufacturing apparatus may not use the sheet-like member wound like a roll or the plate-like elastic member, as long as the additive manufacturing apparatus includes a mechanism that can provide an unworn thickness-determining member in the renewal process.

In addition, although the laser light source is used in the above-described embodiments as a light source to heat the material powder layer having been spread, light other than the laser beam may be used as long as the irradiation energy density of the light can be controlled and can be used for scanning and irradiating the material powder layer. For example, an irradiation optical system in which optical components, such as a high-intensity lamp, s shutter, a variable focusing lens, and a scan mirror, are combined may be used for some cases. In addition, the heating energy-beam irradiation portion may not be the device that emits a light beam, and may be a device that emits an electron beam.

In addition, the material powder may be selected from a variety of materials, such as metal powder and resin powders including ABS and PEEK, and the particle diameter may be selected as appropriate in accordance with a selected material.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-153044, filed Aug. 23, 2019, and Japanese Patent Application No. 2020-109231, filed Jun. 25, 2020 which are hereby incorporated by reference herein in their entirety.

What is claimed is:

1. An additive manufacturing apparatus comprising:
a table;
a thickness determining member that determines a thickness of a powder layer to be formed on the table, the thickness determining member including a sheet member, the sheet member being configured to lay the powder layer on the table and such that an edge portion of the sheet member contacts the powder;
a holding portion configured to hold the thickness determining member, the holding portion comprising a moving mechanism configured to move the thickness determining member horizontally above the table and a cutting portion configured to cut the edge portion of the sheet member;
an energy beam irradiating portion configured to irradiate the powder layer with an energy beam; and
a control unit configured to control the holding portion and the energy beam irradiating portion, respectively,
wherein the control unit is configured to cause the cutting portion to cut the edge portion of the sheet member on a timing for renewing a contact surface of the sheet member.

2. The apparatus according to claim 1, wherein the thickness determining member comprises a fixing member configured to nip and fix the sheet member, the fixing member including an adjustment mechanism configured to adjust an amount of projection of the sheet member from the fixing member, and
wherein the control unit is configured to operate the adjustment mechanism to adjust the amount of projection of the sheet member from the fixing member, before operating the cutting portion.

3. The apparatus according to claim 1, wherein the sheet member is an elastic member.

4. The apparatus according to claim 1, wherein the control unit is configured to operate the cutting portion while the energy beam irradiating portion is operating.

5. The apparatus according to claim 1, wherein the control unit is configured to control the holding portion such that the moving mechanism moves the thickness determining member to a predetermined position and the cutting portion operates on the predetermined position.

6. The apparatus according to claim 1, further comprising a sensor configured to measure a shape of the edge portion, wherein the control unit is configured to operate the cutting portion based on a measurement result of the sensor.

7. The apparatus according to claim 6, wherein the sensor includes at least one of an image sensor, a distance sensor, and an ultrasonic sensor, arranged outside the table.

8. The apparatus according to claim 1, wherein the timing for renewing is any one of a timing when a predetermined number of powder layers are formed, a timing when a step of laying the powder layer is executed a predetermined number of times, and a timing when a total value of areas of solidified layers reaches a predetermined value.

9. An additive manufacturing apparatus comprising:
a table;
a thickness determining member configured to lay a powder layer on the table and determine a thickness of the powder layer, wherein the thickness determining member includes two roll supports and a roller, the two roll supports being configured to stretch and convey a sheet member, the roller being configured to push the sheet member against the powder;
a holding portion configured to hold the thickness determining member, the holding portion comprising a moving mechanism configured to move the thickness determining member horizontally above the table;
an energy beam irradiating portion configured to irradiate the powder layer with an energy beam; and
a control unit configured to control an operation of the thickness determining member,
wherein the control unit is configured to cause the two roll supports to move the sheet member on a timing for renewing a contact surface of the sheet member.

10. The apparatus according to claim 9, wherein the sheet member is an elastic member.

11. The apparatus according to claim 9, further comprising a sensor configured to measure a shape of the sheet member,
wherein the control unit is configured to operate the two roll supports based on a measurement result of the sensor.

12. The apparatus according to claim 11, wherein the sensor includes at least one of an image sensor, a distance sensor, and an ultrasonic sensor.

13. The apparatus according to claim 9, wherein the timing for renewing is any one of a timing when a predetermined number of powder layers are formed, a timing when a step of laying the powder layer is executed a predetermined number of times, and a timing when a total value of areas of solidified layers reaches a predetermined value.

* * * * *